(12) United States Patent
Cavalcanti et al.

(10) Patent No.: US 9,595,038 B1
(45) Date of Patent: Mar. 14, 2017

(54) INVENTORY CONFIRMATION

(71) Applicant: Amazon Technologies, Inc., Seattle, WA (US)

(72) Inventors: Daniel Hafner Cavalcanti, Bellevue, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/715,505

(22) Filed: May 18, 2015

(51) Int. Cl.
*G06K 9/00* (2006.01)
*G06Q 30/00* (2012.01)
(Continued)

(52) U.S. Cl.
CPC ........... *G06Q 30/0185* (2013.01); *G06K 9/48* (2013.01); *G06T 3/0006* (2013.01);
(Continued)

(58) Field of Classification Search
CPC ........ G05B 19/042; G05B 2219/23026; H04N 7/163; H04N 2005/91364; H04N 21/4405; H04N 21/44204; H04N 21/4753; H04N 21/6581; H04N 21/44222; H04N 21/4263; H04N 21/44218; G06F 3/0481; G06F 17/30876; G06F 17/30047; G06F 19/22; G06F 21/44; G06F 17/30253; G06K 9/00369; G06K 9/62; G06K 9/00362; G06K 19/06037; G06K 7/1456; G06K 7/1097; G06K 9/3216; G06K 19/06159; G06K 9/00127; G06N 5/025; G06Q 30/0261; G06Q 10/087; G06Q 30/018; G06Q 40/02; G06Q 40/04; G06T 2207/10028; G06T 2207/20081; G06T 7/0046; G06T 2207/30108; G06T 7/0022; G06T 7/0012; G06T 7/0087; G06T 7/2033; G01S 13/04; E01C 19/288; E02D 3/046; B42D 25/305; H01L 27/1214; G07B 2017/00443;
(Continued)

(56) References Cited

U.S. PATENT DOCUMENTS 6,246,778 B1 * 6/2001 Moore ............. G07B 17/00435
340/5.1
6,456,729 B1 * 9/2002 Moore ............. G07B 17/00435
235/491
(Continued)

*Primary Examiner* — Vu Le
*Assistant Examiner* — Aklilu Woldemariam
(74) *Attorney, Agent, or Firm* — Athorus, PLLC

(57) ABSTRACT

Images of items may be evaluated to identify one or more attributes of the items, including points, contours or shapes corresponding to such items or their packaging, in order to determine whether such items are authentic or counterfeit. Such attributes may be compared to corresponding attributes of items that are known to be authentic. If the attributes identified in an image of an item arriving at a fulfillment center are determined to be consistent with attributes identified in an image of an authentic item, then the item arriving at the fulfillment center may be deemed authentic. If, however, the attributes identified in the image of the item arriving at the fulfillment center are not determined to be consistent with any attributes identified in images of any authentic items, then the item arriving at the fulfillment center may be deemed counterfeit.

22 Claims, 13 Drawing Sheets

(51) Int. Cl.
    *G06T 7/60* (2006.01)
    *G06K 9/48* (2006.01)
    *G06T 3/00* (2006.01)
    *G06T 7/00* (2006.01)
(52) U.S. Cl.
    CPC ............ *G06T 7/0002* (2013.01); *G06T 7/602* (2013.01); *G06K 9/00* (2013.01)
(58) Field of Classification Search
    CPC ... H04L 9/3226; H04L 9/3234; H04L 9/3247; H04L 63/123; H04L 9/3231; B82Y 10/00; G07D 7/122; C09D 11/101; G01N 21/9508; G01N 15/1475; G02B 21/008
    USPC ....... 382/100, 103, 112, 128, 129, 130, 131, 382/305
    See application file for complete search history.

(56) References Cited

U.S. PATENT DOCUMENTS

| | | | | |
|---|---|---|---|---|
| 6,606,396 B1* | 8/2003 | Ishibashi | ............ | G06K 7/14 283/72 |
| 8,197,439 B2* | 6/2012 | Wang | ............ | A61M 1/28 604/67 |
| 8,335,789 B2* | 12/2012 | Hull | ............ | G06F 17/30247 707/736 |
| 8,547,524 B2* | 10/2013 | Roberts | ............ | G02B 27/2292 355/67 |
| 8,712,163 B1* | 4/2014 | Osheroff | ............ | G06K 9/00 382/149 |
| 2004/0153408 A1* | 8/2004 | Jones | ............ | G06Q 20/042 705/43 |
| 2005/0061878 A1* | 3/2005 | Barenburg | ............ | G06K 7/1434 235/385 |
| 2005/0286747 A1* | 12/2005 | Azuma | ............ | G06T 7/0012 382/117 |
| 2007/0152056 A1* | 7/2007 | Tuschel | ............ | G06K 19/06037 235/454 |
| 2007/0165904 A1* | 7/2007 | Nudd | ............ | G06Q 20/20 382/100 |
| 2007/0221732 A1* | 9/2007 | Tuschel | ............ | G06K 19/06037 235/462.01 |
| 2009/0080735 A1* | 3/2009 | Chapman | ............ | G06T 7/0004 382/128 |
| 2010/0215231 A1* | 8/2010 | Bartfeld | ............ | G06F 19/3462 382/128 |
| 2010/0289627 A1* | 11/2010 | McAllister | ............ | G06Q 10/087 340/10.42 |
| 2010/0329507 A1* | 12/2010 | Manabe | ............ | G07D 7/122 382/100 |
| 2011/0161076 A1* | 6/2011 | Davis | ............ | G06F 3/04842 704/231 |
| 2014/0363048 A1* | 12/2014 | Vrcelj | ............ | G06K 9/78 382/103 |
| 2015/0302421 A1* | 10/2015 | Caton | ............ | G06Q 30/018 705/17 |

* cited by examiner

PRODUCT RECEIVED FROM MERCHANT

AUTHENTIC ORIGINAL PRODUCT

GEOMETRIC REPRESENTATIONS
PROVIDED ON AUTHENTIC PRODUCT

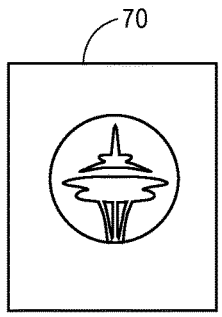

| HULL | 1250 px x 2250 px, CORNERS AT (0 px, 0 px), 1250 px, 0 px), (0 px, 2250 px), 1250 px, 2250 px) |
|---|---|
| CIRCLE | CENTER AT (625 px, 1000 px), RADIUS 400 px |
| TRIANGLE | ISOCELES WITH SIDES 300 px, 300 px, 95 px. CORNERS AT (625 px, 650 px), (575 px, 900 px), (675 px, 900 px) |
| ELLIPSE | FOCAL POINT A (515 px, 950 px), FOCAL POINT B (785 px, 950 px), EQUIDISTANCE 500 px |
| ELLIPSE | FOCAL POINT A (515 px, 1150 px), FOCAL POINT B (785 px, 1150 px), EQUIDISTANCE 295 px |
| TRIANGLE | EQUILATERAL WITH SIDES 300 px, 300 px, 300 px. CORNERS AT (380 px, 1225 px), (660 px, 1225 px), (625 px, 1375 px) |

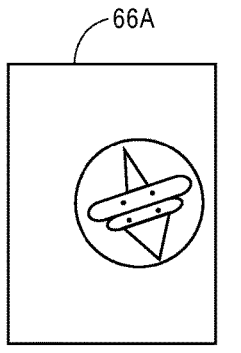

ARRIVING PRODUCT

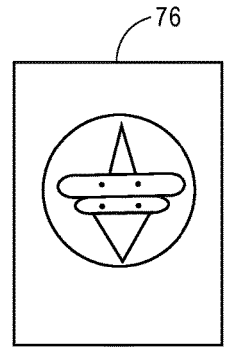

AUTHENTIC PRODUCT

ARRIVING PRODUCT IMAGE ATTRIBUTES DETERMINED TO MATCH
AUTHENTIC PRODUCT IMAGE ATTRIBUTES, TO WITHIN PREDETERMINED
TOLERANCE

ARRIVING PRODUCT IS AUTHENTIC

FIG. 7A

GEOMETRIC REPRESENTATIONS
PROVIDED ON AUTHENTIC PRODUCT

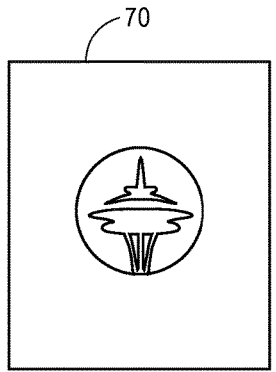

| HULL | 1250 px x 2250 px, CORNERS AT (0 px, 0 px), 1250 px, 0 px), (0 px, 2250 px), 1250 px, 2250 px) |
| --- | --- |
| CIRCLE | CENTER AT (625 px, 1000 px), RADIUS 400 px |
| TRIANGLE | ISOCELES WITH SIDES 300 px, 300 px, 95 px. CORNERS AT (625 px, 650 px), (575 px, 900 px), (675 px, 900 px) |
| ELLIPSE | FOCAL POINT A (515 px, 950 px), FOCAL POINT B (785 px, 950 px), EQUIDISTANCE 500 px |
| ELLIPSE | FOCAL POINT A (515 px, 1150 px), FOCAL POINT B (785 px, 1150 px), EQUIDISTANCE 295 px |
| TRIANGLE | EQUILATERAL WITH SIDES 300 px, 300 px, 300 px. CORNERS AT (380 px, 1225 px), (660 px, 1225 px), (625 px, 1375 px) |

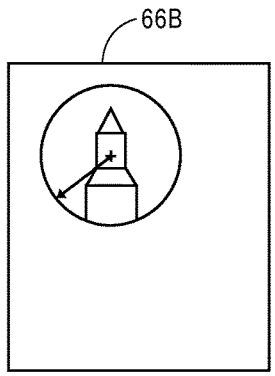

ARRIVING PRODUCT

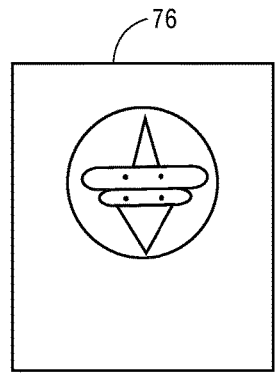

AUTHENTIC PRODUCT

ARRIVING PRODUCT IMAGE ATTRIBUTES DETERMINED NOT TO
MATCH AUTHENTIC PRODUCT IMAGE ATTRIBUTES

ARRIVING PRODUCT IS COUNTERFEIT

FIG. 7B

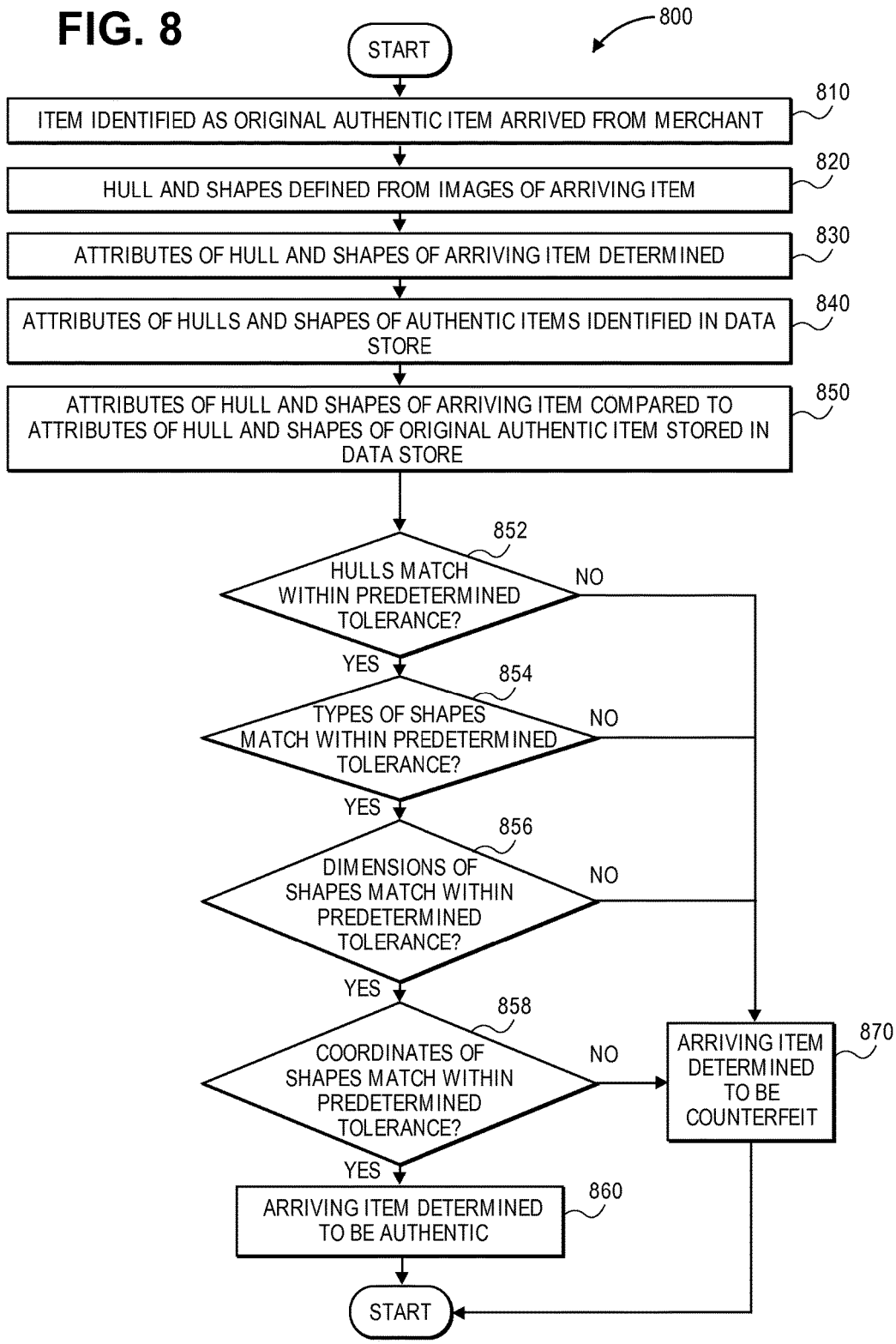

INVENTORY CONFIRMATION

BACKGROUND

A counterfeit item is an item, typically of inferior quality, that is manufactured, marketed or sold under a trademark or brand name for the purpose of competing with or acting as a substitute for an authentic (or original) item associated with the trademark or brand name, without the permission of the trademark or brand owner. Such items, which are sometimes called "knockoffs," are commonly manufactured or assembled in low-cost environments that are subject to significantly relaxed standards, and wrapped in packages having labels, characters, trademarks or other indicia that are similar to those of the authentic goods. Moreover, the number, type, size and value of items that may be counterfeited are unlimited. Currently, some categories of items that are commonly counterfeited include, but are not limited to, electronics, shoes, drugs, multimedia (e.g., movies, music or video games stored on discs or other storage media), clothing, perfumes, watches, cigarettes, computer hardware or toys.

The damages that may result from counterfeiting are numerous and widespread. In many instances, counterfeiting may cause actual, physical harm to purchasers or users of counterfeit items. For example, counterfeit pharmaceuticals that are prepared by unlicensed workers in substandard facilities may contain impurities or other harmful ingredients in unacceptable concentrations and may lead to adverse effects in patients who consume them. Likewise, counterfeit auto parts or other equipment may fail sooner or in different manners than the authentic items from which they were modeled, thereby increasing the risk of an accident, or broadening the extent of damage or injury in the event of an accident.

Furthermore, counterfeiting results in economic damage to brand owners who legitimately invest in their brands and their products, and accrue hard-earned goodwill in the process. When purchasers determine that a counterfeit item that they have purchased is not an authentic item that they intended to purchase, or does not possess the level of quality associated with the authentic item, their confidence in the brands associated with the authentic item may suffer. Where counterfeit items are sold at substantially lower prices, state and local governments also receive reduced sales tax revenues in return. Moreover, counterfeiting is also commonly associated with criminal activity ranging from sporadic, isolated criminal incidents to widespread crime organized at one or more levels.

Online marketplaces enable customers to search for or browse information regarding items that are available for purchase from a variety of sources and in a variety of ways through one or more networked pages or sites. For example, an online marketplace may offer items for sale that it owns and controls, as well as items that are owned or controlled by sellers. The sellers may elect to either deliver their items to a facility maintained by the online marketplace for distribution to customers; or maintain control over their items themselves, and deliver items ordered from the online marketplace directly to customers who purchased them.

Recently, the expansion of electronic commerce through forums such as online marketplaces has led to a corresponding increase in the sale of counterfeit goods over the Internet. Although the sale of counterfeit goods was historically associated with back-alley or backroom transactions occurring out of public view, the ever-evolving versatility of online marketplaces enables a counterfeit item to be sold online, in full view, and with the buyer and the seller never meeting face-to-face. Because online marketplaces now permit sellers from every corner of the globe to offer items to customers in similarly diverse locations through one or more web pages, the challenge associated with identifying counterfeit items that a seller intends to offer for sale via an online marketplace is particularly daunting.

BRIEF DESCRIPTION OF THE DRAWINGS

FIGS. 7A and 7B are views of data considered by embodiments of systems or methods for inventory confirmation in accordance with embodiments of the present disclosure.

FIG. 8 is a flow chart of one process for inventory confirmation in accordance with embodiments of the present disclosure.

DETAILED DESCRIPTION

As is set forth in greater detail below, the present disclosure is directed to systems and methods for confirming the quality and legitimacy of inventory arriving at a given location, such as a fulfillment center, a warehouse or another like facility. More specifically, embodiments of the systems and methods disclosed herein are directed to detecting compliant inventory (e.g., authentic inventory, acceptable inventory, or inventory that fails to comply with one or more relevant standards) based on invariant features expressed in images of packages in which the inventory is provided. Such systems and methods disclosed herein may capture images or imaging data from one or more surfaces of items arriving at a facility, such as a fulfillment center or warehouse, and define one or more compact geometric representations of the arriving items and/or their packaging (e.g., labels, characters, trademarks or other indicia provided on the items or packaging) based on the images or imaging data. The geometric representations may include or describe parameters of any geometric features expressed in the images or imaging data, including any shapes, lines or line segments, arcs or other features of the items or their packaging represented therein, in terms of their absolute or relative positions or dimensions within the images or imaging data. The geometric representations may then be compared to a set of compact geometric representations of other items or packages that have been confirmed to be compliant, authentic, standard or otherwise acceptable, including but not limited to a geometric representation of a compliant item as which the arriving item has been described by a merchant, and a confidence level or other qualitative or quantitative metric indicative of the correlation or similarity of the geometric representations may be determined.

Where the geometric representations of the arriving items or their packaging are determined to be sufficiently consistent with the geometric representations of compliant, authentic, standard or otherwise acceptable items, or the packaging in which such authentic or original items are provided, then the arriving items may then be confirmed as authentic or original. Where the geometric representations of the arriving items or their packaging deviate from the geometric representations of the compliant, authentic, standard or otherwise acceptable items or their packaging, however, then the arriving items may be presumed to be non-compliant, counterfeit, substandard or otherwise unacceptable.

Figure 1A:
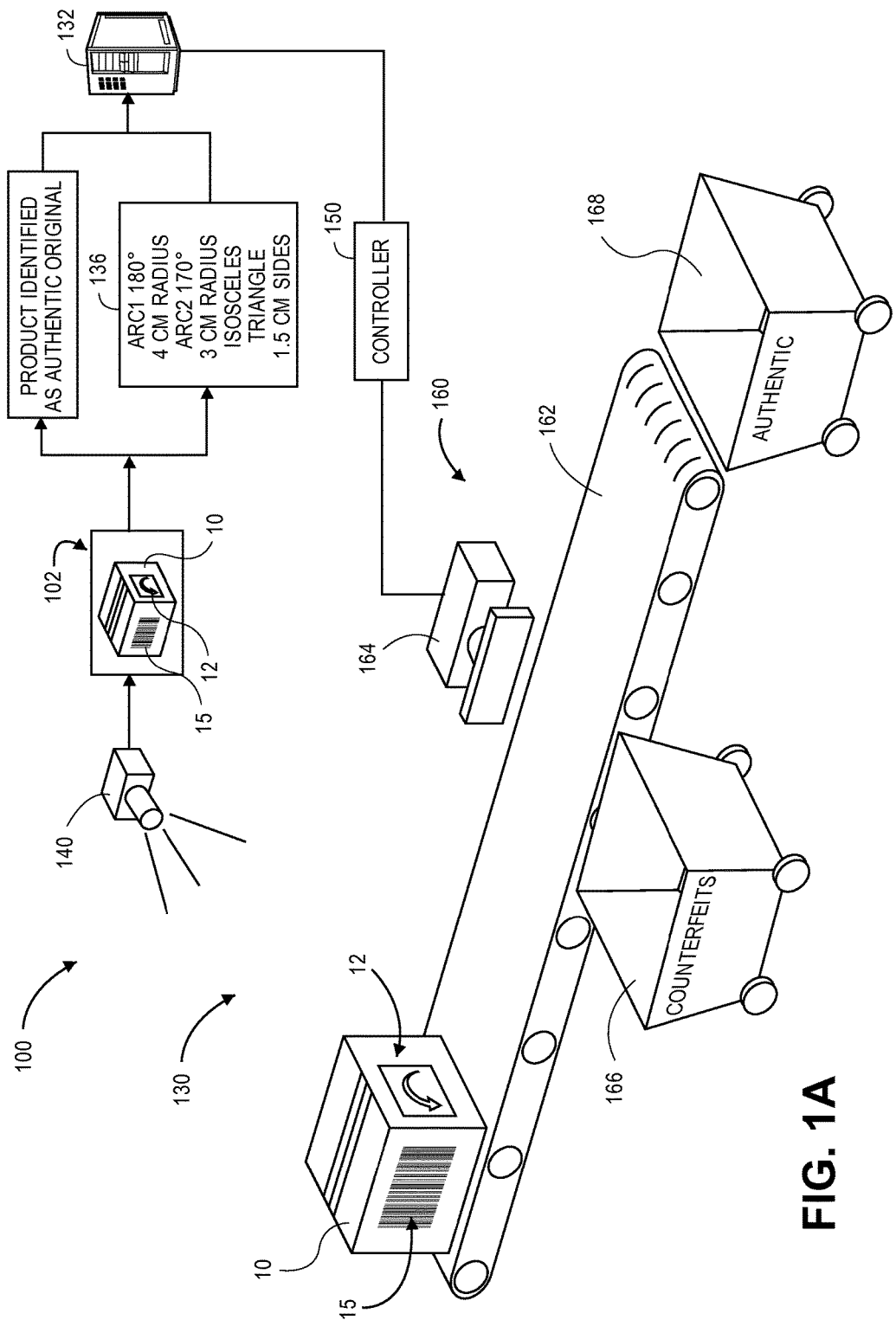
FIGS. 1A through 1E are views of aspects of a system for inventory confirmation in accordance with embodiments of the present disclosure.

Referring to FIGS. 1A through 1E, aspects of one system 100 for inventory confirmation are shown. As is shown in FIG. 1A, the system includes a fulfillment center 130 having a server 132, an imaging device 140, a controller 150 and a conveyor assembly 160. The conveyor assembly 160 includes a conveyor 162 (e.g., a conveyor belt), a divert mechanism 164, a bin 166 for receiving non-compliant items and a bin 168 for receiving compliant items.

An item 10 bearing a mark 12 (e.g., an arcuate arrow with head) and an identifier 15 (e.g., an optically readable marking of any kind or form, such as a bar code) on one or more external surfaces travels on the conveyor 162. The imaging device 140 is configured to capture one or more images 102 of items passing along the conveyor 162 (viz., the item 10), and to evaluate the images 102, or transfer the images 102 to the server 132 for processing. For example, as is shown in FIG. 1A, the server 132 may evaluate the images 102 in order to interpret the identifier 15, and to associate the item 10 with a compliant item based on the identifier 15, and also to identify one or more attributes of the mark 12. The server 132 may process the images 102 and generate and/or transfer signals, instructions, data or other information 136 to the controller 150 regarding the contents of the images 102.

The controller 150 may be adapted to control one or more aspects of the operation of the system 100 or the fulfillment center 130, including but not limited to the operation of the conveyor assembly 160. For example, the controller 150 may receive one or more instructions from the server 132 and, in response to such instructions, cause one or more motors or other elements of the conveyor assembly 160 to operate the conveyor 162 at any desired speeds, e.g., and to transport one or more items (viz., the item 10) into the bin 168. The controller 150 may also cause one or more motors or other such elements to operate the divert mechanism 162, e.g., to push one or more items (viz., the item 10) off the conveyor 162 and into the bin 166.

In accordance with the present disclosure, the systems and methods disclosed herein may capture imaging data regarding one or more items arriving at a fulfillment center, a warehouse or another like facility, including but not limited to images of the arriving items and/or their packaging, and identify or associate the arriving items with one or more compliant (or authentic, standard or otherwise acceptable) items. For example, an image of an arriving item labeled with a bar code, a fiducial marking, or another identifier, such as the identifier 15 on the item 10, may be evaluated to interpret the identifier, and the arriving item may be associated with a compliant item that is ordinarily linked or associated with (e.g., adorned with) the identifier. The systems and methods may further process the imaging data to generate one or more geometric representations of hulls of the items or their packaging, e.g., external geometric features or boundaries of such items or packaging, as well as any shapes that may be represented on such hulls (e.g., in one or more images or markings provided thereon). Once the geometric representations of such hulls and shapes have been generated, the geometric representations may be compared to a geometric representation of the compliant item with which the arriving item has been identified or otherwise associated, or to geometric representations of other objects that are similarly generated based on imaging data associated with known compliant items (e.g., stock photos) and stored in a database or other data store.

Figure 1B:
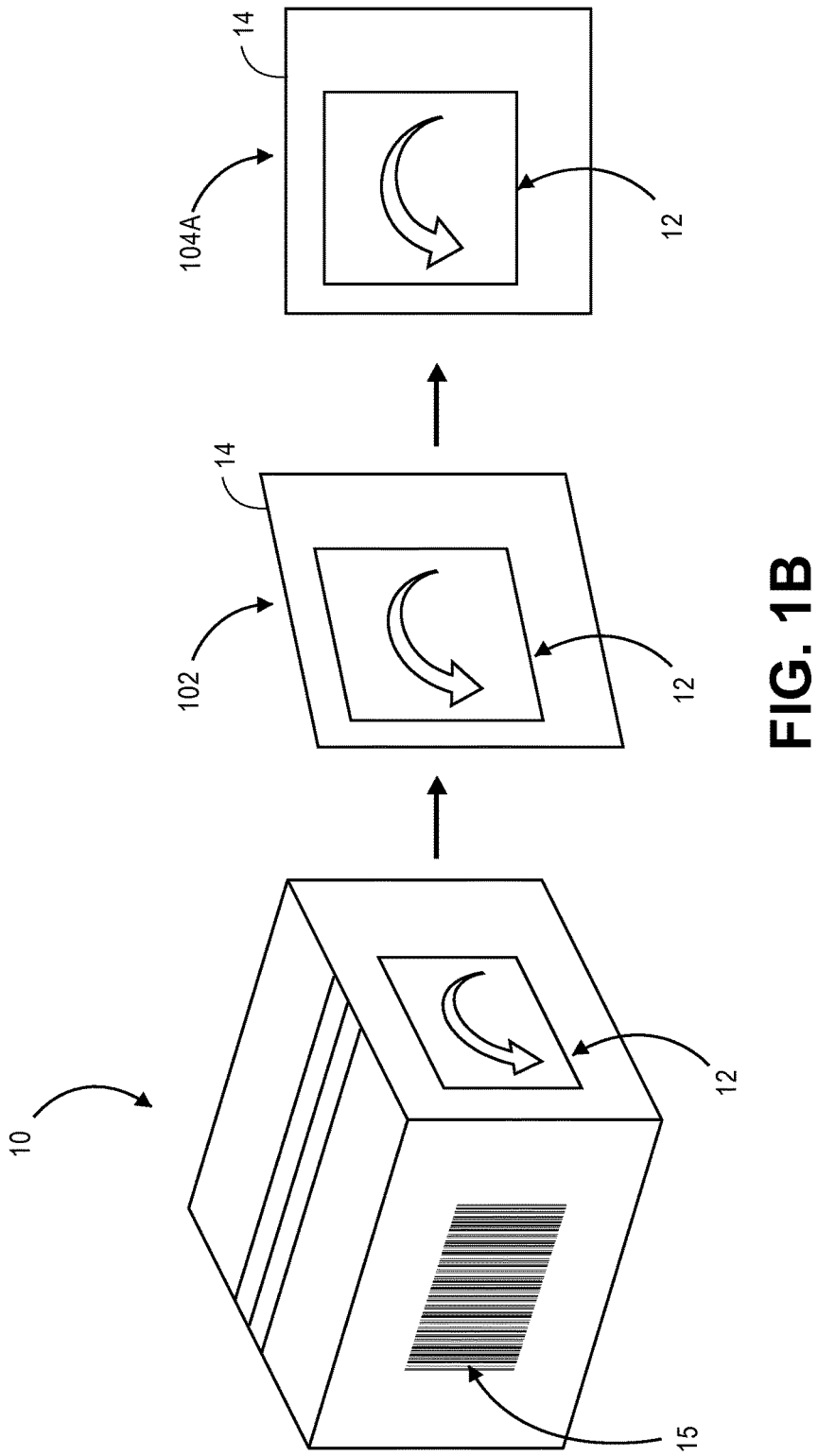

Referring to FIG. 1B, the capture and evaluation of imaging data from the item 10 and the mark 12 are shown. First, the image 102 is captured of the item 10 as the item 10 travels along the conveyor 162, such as is shown in FIG. 1A. Next, the image 102 of the item 10 is transformed or otherwise processed into a normalized image 104A, in which at least one aspect of the item 10, and the mark 12, are expressed in a plane perpendicular to an axis of a field of view of the imaging device 140.

Figure 1C:
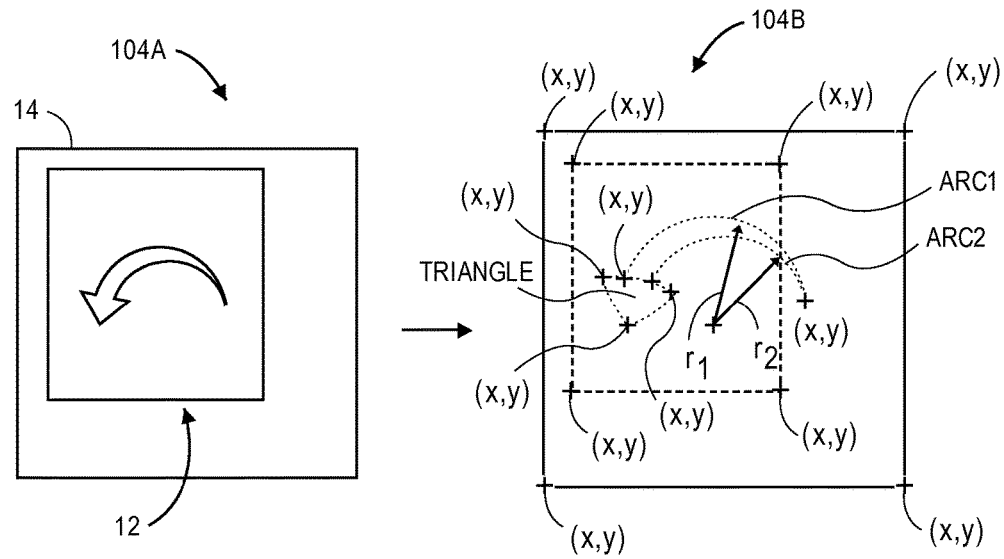

Referring to FIG. 1C, the normalized image 104A of the item 10 and the mark 12 may be further processed into a compact representation 104B thereof. For example, the compact representation 104B of FIG. 1C includes a summary description of elements of a hull 14 (or a boundary or surface feature) of the item 10. The compact representation 104B may express or describe such elements in any manner, e.g., by expressing or describing one or more points of the hull 14 of the item 10 or aspects of the mark 12 as points in space, or by expressing or describing one or more line segments associated with the item 10 or the mark 12 as connections between such points. The compact representation 104B may further express or describe one or more shapes (e.g., polygons) shown on the hull 14 of the item 10 or the mark 12 with identifiers or other descriptors (e.g., square, circle, triangle), or in terms of geometric variables (e.g., radius, angle, length, height, width) with respect to such points. For example, as is shown in FIG. 1C, the compact representation 104B identifies a variety of points included on the hull 14 of the item 10 or of the mark 12 in Cartesian coordinates, e.g., as points (x,y), and as including a pair of arcs provided at specified radii with respect to one of such points. Moreover, the compact representation further includes a description of a shape, such as a triangle, included in the mark 12, viz., at a head of an arrow formed by the pair of arcs.

Figure 1D:
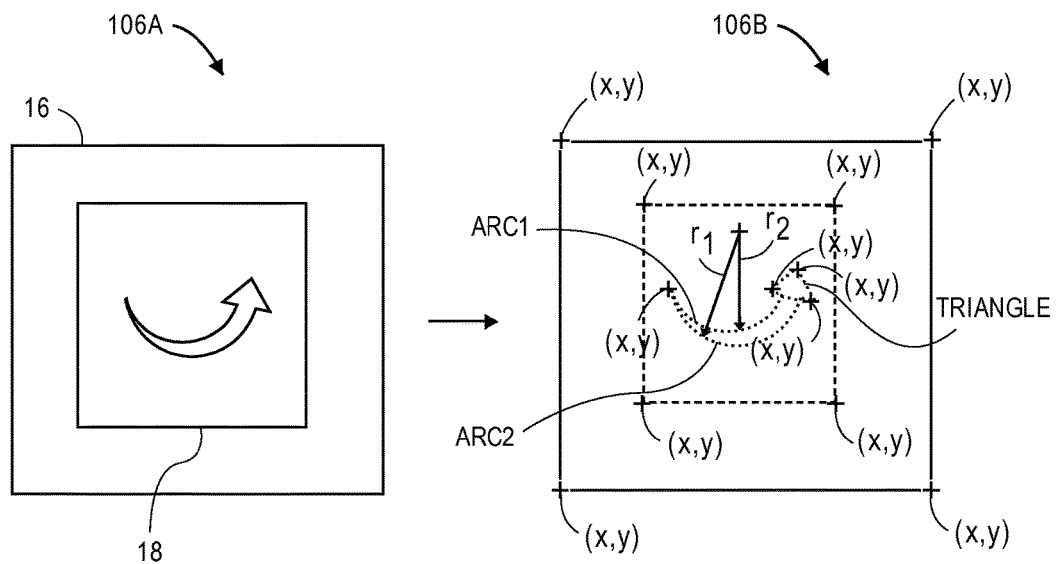

As is discussed above, compact representations of hulls of items arriving at a fulfillment center, a warehouse or another like facility, and shapes provided on such items, may be compared to compact representations of hulls and shapes generated from images or imaging data of items that are known to comply with one or more relevant standards, requirements or criteria. Referring to FIG. 1D, a baseline image 106A of a hull 16 of a compliant item having a mark 18 thereon is shown. The baseline image 106A may be one or more stock photographs of the compliant item that were provided from an authorized source of the compliant item, or were captured upon an arrival of one of the compliant items. The baseline image 106A of FIG. 1D is shown as having been normalized such that the hull 16 and the mark 18 are expressed in a plane perpendicular to the axis of the field of view, and in a manner consistent with that of the image 104A of FIGS. 1B and 1C.

As is shown in FIG. 1D, the baseline image 106A of the hull 16 and the mark 18 is further processed into a compact representation 106B that expresses or describes elements of the hull 16 or the mark 18 as points in space, e.g., as connections between such points, as identifiers or descriptors of shapes, or in terms of geometric variables with respect to such shapes. For example, as is shown in FIG. 1D, the compact representation 106B also identifies a variety of points on the hull 16 of the compliant item in Cartesian coordinates, e.g., as points (x,y), and as a pair of arcs provided at specified radii, and a shape, viz., another triangle, included in the mark 18. Whereas the mark 12 on the item 10 is shown as raised and to the left of the hull 14 in the normalized image 104A of FIGS. 1B and 1C, the mark 18 on the compliant item is shown as centered about the hull 16 of the compliant item in FIG. 1D. The positions and orientations of the features of the hulls 14, 16 and the marks 12, 18 are accordingly expressed in the compact representations 104B, 106B of FIGS. 1C and 1D.

Finally, as is also discussed above, a compact representation of a hull of an arriving item and shapes provided thereon may be compared to compact representations of one or more hulls and shapes of items which comply with one or more relevant standards, requirements or criteria, including a compact representation of hulls or shapes of a compliant item with which the arriving item has been linked or otherwise associated, in order to determine whether the arriving item is compliant. For example, if the hull and shapes expressed in images of the arriving item correspond to hulls and shapes expressed in images of one or more compliant items, to within a predetermined or sufficient tolerance, then the arriving item may be deemed to be not only generally compliant with the one or more relevant standards, requirements or criteria, but also one of the compliant items to which such hulls and shapes correspond. If such hulls and shapes do not correspond to hulls or shapes expressed in images of any known compliant items to within the predetermined or sufficient tolerance, then the arriving item may be flagged as non-compliant or otherwise subject to further evaluation.

Figure 1E:
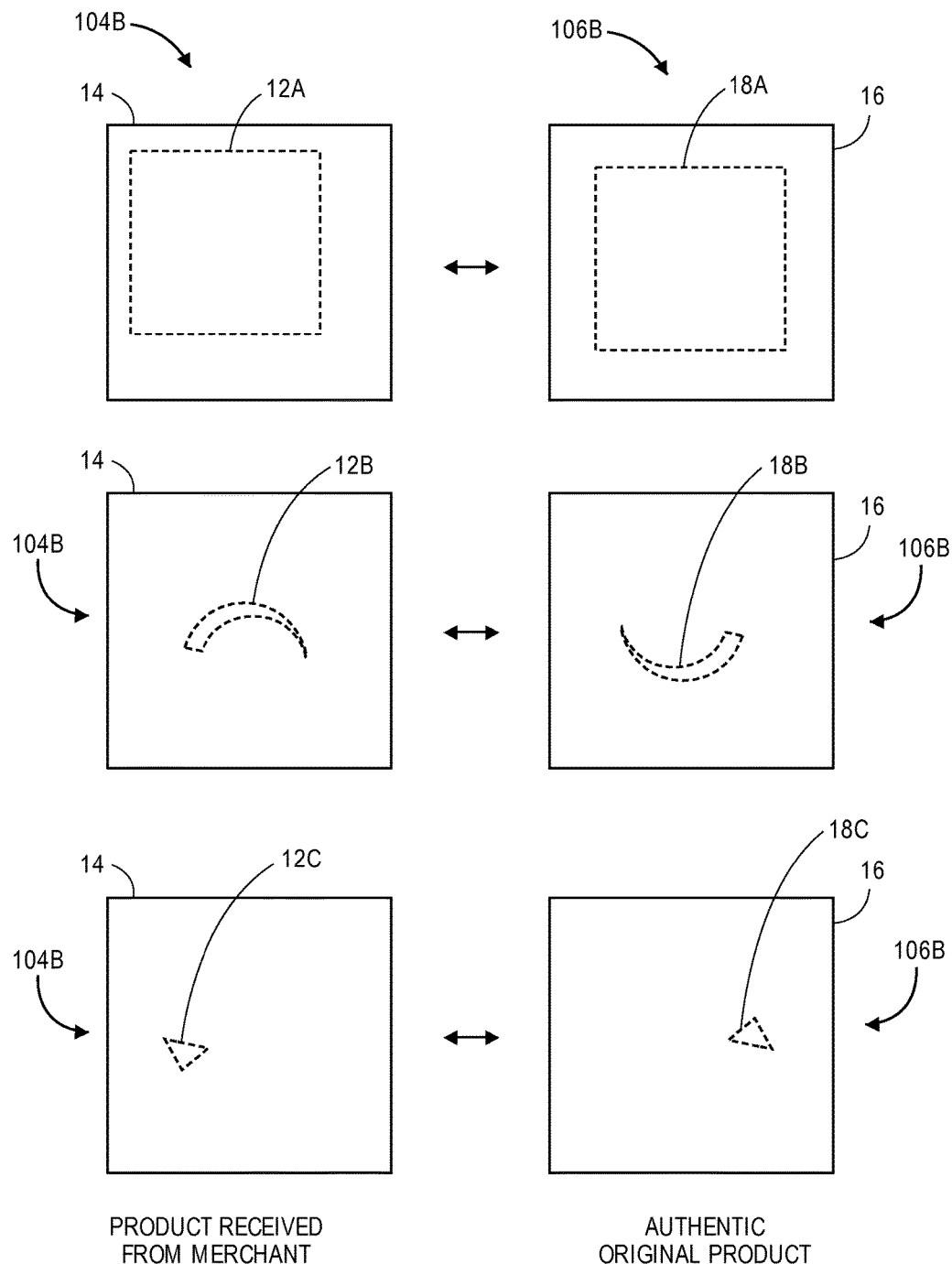

Referring to FIG. 1E, a comparison of the compact representation 104B of the item 10 on the conveyor 162 of FIG. 1A and the compact representation 106B of the compliant item is shown. As is shown in FIG. 1E, the coordinates associated with portions 12A, 12B, 12C of the mark 12 and other features on the hull 14 of the item do not correspond with the coordinates associated with portions 18A, 18B, 18C of the mark 18 and other features on the hull 16 of the compliant item. For example, the mark 12 includes a square frame 12A that is positioned in a raised manner with respect to the hull 14 in the compact representation 104B, and to a left side of the hull 14, while the mark 18 includes a square frame 18A that is positioned substantially centrally within the hull 16 in the compact representation 106B. The mark 12 further includes a pair 12B of arcs extending above a center point of the hull 14 and ending with a shape 12C (e.g., a triangle) as an arrowhead pointing to a left side of the hull 14 within the compact representation 104B, while the mark 18 includes a pair 18B of arcs extending below a center point of the hull 16 and ending with a shape 18C (e.g., a triangle) as an arrowhead pointing to a right side of the hull 16 within the compact representation 106B. A determination as to whether the item 10 is compliant, or is non-compliant, may be made with regard to a qualitative or quantitative factor, e.g., a confidence score or interval, indicating the extent to which the mark 12 and the portions 12A, 12B, 12C thereof coincide with the mark 18 and the portions 18A, 18B, 18C, such that the item 10 may be deemed compliant if the confidence score or interval equals or exceeds a threshold, and that the item 10 may be deemed non-compliant if the confidence score falls below the threshold. Because the compact representation 104B derived based on the image 104A of FIG. 1C is starkly different than the compact representation 106B derived based on the image 106A of FIG. 1D, the item 10 is deemed to fail to comply with one or more relevant standards, requirements or criteria, e.g., a counterfeit, substandard or otherwise unacceptable item.

Accordingly, the systems and methods of the present disclosure may detect whether arriving inventory, which a source of the arriving item may attempt to pass off as an authentic or original item, is compliant, authentic, standard or otherwise acceptable, or is non-compliant, counterfeit, substandard or otherwise unacceptable, based on representations of features expressed in images or imaging data of items or their packaging that may deviate from representations of invariant features of items or packaging that are known or believed to be compliant, authentic, standard or otherwise acceptable, including representations of such features of a compliant, authentic, standard or otherwise acceptable item, or packaging of the compliant, authentic, standard or otherwise acceptable item.

Online marketplaces typically maintain networked sites (e.g., web sites) or other online portals that offer items of any kind for sale to customers. A site or portal maintained by an online marketplace typically includes one or more interactive features which permit customers to search for or browse information regarding any number of items, and to execute one or more interactions for ordering one or more of the items for delivery.

Items that are offered for sale at an online marketplace may originate from any number or type of sources, including one or more sellers of such items, or from the online marketplace itself. A seller may elect to make its items available for sale through an online marketplace in any number of ways, and on any terms that may be agreed upon between the seller and the online marketplace. For example, a seller may sell items to the online marketplace directly, either singly or in bulk, for their ultimate resale to customers. The online marketplace may then place the items in storage, generate one or more interactive network pages including information regarding the items (e.g., a name and/or image of an item, a cost of the item, an item number or part number for the item, dimensions or features of the item, as well as customer ratings or reviews of the item), along with features for purchasing the items (e.g., links, buttons or other features for adding the item to a virtual shopping cart or wish list, for purchasing the items outright, or for recommending the item to one or more friends, family members or colleagues), and make such "detail" pages available to customers over a network, such as the Internet. When a customer places an order for one of the items through one or more detail pages at the online marketplace, a transaction may be executed between the online marketplace and the customer, and the ordered item may be retrieved from storage, prepared for delivery, and shipped to the customer.

Additionally, the seller may deliver items to the online marketplace on consignment, and the items may be placed in a fulfillment center or other designated location or facility under the control of the online marketplace on behalf of the seller. The online marketplace may then generate one or more interactive detail pages for the items, and make such detail pages available to customers. When a customer places an order for one of the items that has been delivered to the online marketplace under consignment, a transaction may be executed between the online marketplace and the customer. The online marketplace may then receive funds from the customer in exchange for the ordered item, retrieve the ordered item from the fulfillment center or other designated location, deliver the ordered item to the customer from the fulfillment center or other designated location to the customer, and remit funds for the purchase of the ordered item to the seller, less any applicable service fees or charges that may be due and owing.

Also, a seller may maintain control over the items that it intends to offer for sale through the online marketplace, but may merely provide information regarding the offered items to the online marketplace. The online marketplace may then generate one or more interactive detail pages for the items, and make such detail pages available to customers. When a customer places an order for an item that is held by the seller, a transaction may be executed between the online marketplace and the customer. The online marketplace may then receive funds from the customer in exchange for the ordered item, and provide information regarding the customer and the order (e.g., specifications of the ordered item and a shipping address or destination for the ordered item) to the seller, with respect to either an individual order or a number of orders, along with an instruction to deliver the ordered item to the customer. The seller may then arrange for the delivery of the item to an address or destination specified by the customer, and receive funds for the purchase of the ordered item from the online marketplace, less any applicable service fees or charges that may be due and owing.

Online marketplaces, like all other commercial forums, may also be ripe targets for counterfeiters or other vendors having surreptitious motives to market their wares to customers. For example, a competitor may commonly identify a popular and valuable item that it intends to sell to consumers, and then photocopy or otherwise create a facsimile of the packaging ordinarily associated with the item, manufacture an imitation of the item, wrap the imitation in the copied or facsimiled packaging, and offer the imitation for sale in the copied or facsimiled packaging. Frequently, however, a copied or facsimiled package may have a number of visible differences from the original packaging, including slight differences in shapes of the packaging, or errors in the placement of features of images on the packaging that may not be evident to the naked eye or upon a brief glance.

Because a modern online marketplace may offer hundreds of millions of items in a diverse array of categories or types, and because hundreds of transactions for the purchase of such items may be executed each second, operators of online marketplaces frequently find it very difficult to identify and distinguish between inventory that complies with one or more relevant standards, requirements or criteria (e.g., compliant, authentic, standard or otherwise acceptable items) and inventory that fails to comply with the one or more relevant standards, requirements or criteria (e.g., non-compliant, counterfeit, substandard or otherwise unacceptable items). Moreover, because the actions or transactions by which an online marketplace may present items for sale thereon (e.g., the shipment of goods to a fulfillment center or other facility, or the generation of a detail page including information regarding such goods along with one or more interactive features for executing purchases of such goods) may occur at high rates of speed and without a face-to-face connection between two or more humans, the ability to peruse records associated with such transactions, identify counterfeit items using computer devices according to a data-driven approach (e.g., by automatically auditing information regarding arriving items and flagging any items of questionable authenticity) is sometimes infeasible and frequently inadequate.

Fulfillment centers or other locations or facilities operated by online marketplaces may include any number of operational apparatuses for receiving items from sellers, and preparing such items for storage and distribution to customers, including but not limited to one or more conveyor systems for transporting such items from one location to another. The conveyor systems may typically include any number of machines or elements for causing the motion or translation of such items, and may be driven by any form of mover, including belts, chains, screws, tracks or rollers for transporting items in a container or carrier, or on or within the mover itself. For example, one component commonly found in conveyor systems is a conveyor belt, which may include a banded continuous-loop belt (e.g., rubber or fabric) that is placed into motion by a series of two or more pulleys, at least one of which is driven by a motor. Items may be placed directly onto the belt, or into one or more bins or like containers that may be placed on the belt. A conveyor system may further include one or more pulleys, shafts, hubs, bushings, sprockets, bearings and other elements for causing a movement of the conveyor. Further, a conveyor system may convey items or materials into one or more static or dynamic apparatuses, such as a bin, a chute, a cart, a truck or another like machine.

The movement of items within a fulfillment center, e.g., on a conveyor belt or other conveyor system, is commonly monitored using one or more imaging devices, e.g., digital cameras. Imaging devices may operate by capturing light that is reflected from objects, and by subsequently calculating or assigning one or more quantitative values to aspects of the reflected light, e.g., pixels, generating an output based on such values, and storing such values in one or more data stores. Imaging devices may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet. Data files that are stored in one or more data stores may be printed onto paper, presented on one or more computer displays, or subjected to one or more analyses, such as to identify items expressed therein.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Once the characteristics of stationary or moving objects or portions thereof have been recognized in one or more digital images, such characteristics of the objects or portions thereof may be matched against information regarding edges, contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

Relying on the simplicity and the versatility of large-scale computer networks such as the Internet, an online marketplace may be accessed by hundreds of thousands or millions of customers using an ever-widening array of computing devices from every corner of the globe. Thus, the purchase and sale of one or more items to customers through an online marketplace may involve the exchange of countless online messages or instructions, transfers of funds, and deliveries of the items by and between sellers, customers and the online marketplace itself, to or from any number of locations.

As is discussed above, and in greater detail below, the systems and methods of the present disclosure are directed to confirming the quality and legitimacy of inventory arriving at a given location using imaging data. More specifically, the systems and methods of the present disclosure may capture imaging data regarding an item (e.g., an item arriving at a fulfillment center, a warehouse or another like facility), and generate a compact representation of a hull of the item, as well as any shapes or other features that may be expressed thereon. Such representations may indicate, in mathematical or relational terms, the locations, orientations or other features of the hull, the shapes or the features thereon, e.g., information or data regarding colors, contours, coordinates or other attributes provided on or associated with surfaces of the item.

Once the compact representation of the hull of the item and any shapes or other features has been generated, the compact representation may be compared to compact representations of hulls and shapes or other features generated based on baseline images or other imaging data of items that are known to comply with one or more relevant standards, requirements or criteria (e.g., authentic, standard or otherwise acceptable items). A comparison of images or imaging data of an arriving item to baseline images or imaging data of compliant items may indicate whether the hull (e.g., the external topography of the arriving item and/or packaging of the arriving item) and any lines, shapes or other markings of the arriving item are consistent with those of one or more of the compliant items. A determination as to whether the arriving item is compliant may thus be made on a rapid and effective basis by comparing attributes of key features shown on packaging of the arriving item to the attributes of key features of other items.

The compact representations of the hulls of items or their packaging, and the shapes or other markings provided thereon, may be derived or defined in any manner. For example, identifying a hull of an item and shapes thereon may begin with a single transformation or translation of one or more images of various faces or aspects of the item, which normalizes the images and causes one or more faces of the item to appear in a consistent manner with respect to a common plane and orientation. Next, an edge detection process, technique or algorithm (e.g., Canny edge detection, Sobel operation or the like) may be run on the normalized image to recognize features of the hull of the item, and any shapes or other geometric features or representations (e.g., straight or curvilinear lines, polygons, or other frames, contours or outlines) provided thereon.

Finally, attributes of the hull and any shapes may be determined and stored in a table, record or other artifact maintained in a database or other data store. Such attributes may include mathematical or relational descriptions of the geometric features or representations provided on the item with reference to specific points on the surfaces of the item, lines or line segments extending between such points, polygons or other elements formed by such lines or line segments, or any other relevant information or data including identifiers of colors of such shapes, e.g., according to the RGB model. The processes for generating compact representations of hulls of items or their packaging, and the shapes or other markings provided thereon, may be utilized in connection with an item regardless of whether the item is known to be compliant (e.g., in order to identify hulls and/or shapes from a baseline image of the item), or whether the item has newly arrived at a fulfillment center, a warehouse or like facility, and the level of compliance of the item has yet to be established.

For example, where an item is provided in a rectangular solid package, an image of the package may be captured and normalized, and coordinates corresponding to the shape of the package, e.g., the hull of the item, may be determined and stored. Subsequently, any shapes or other markings on the package may be located and determined. For example, a circle or a portion thereof (e.g., an arc) may be identified with respect to coordinates of a center and a length of a radius, as well as an angle subtended by an arc thereof where the arc is less than a complete circle. An ellipse may be defined with respect to coordinates of each of a pair of focal points, and the sum of the distances between each point on the ellipse and each of the focal points. A polygon (e.g., a triangle, a rectangle or other quadrilateral, a pentagon, a hexagon or any other shape bounded by line segments) may be defined with respect to coordinates of each of the corners of the shape, as well as lengths or distances between such corners. A parabola may be defined with respect to coordinates of a focus, an equation or coordinates corresponding to a directrix, or an equation defining the distances between the focus and the directrix, while a hyperbola may be defined with regard to coordinates of a center or a focal point, or equations defining major or minor axes.

Those of ordinary skill in the pertinent arts will recognize that any type of shape or other element that may be recognized in an image and represented in a mathematical or geometric manner may be associated with a hull of an item or a shape expressed on or within the hull of the item in accordance with the present disclosure. Likewise, the attributes of the hulls or shapes, which may include but are not limited to colors, contours, coordinates or other indicators of position, equations representing lines or line segments, and any identifiers or other metadata identifying attributes of hulls or shapes as such (e.g., square, circle, rectangle, triangle), may be stored in one or more data stores and utilized by embodiments of any of the systems and methods disclosed herein. Attributes of elements shown in a hull or shapes identified from an image of an item, including but not limited to an image of an arriving item, or a baseline image of an item that is known to be authentic, may be expressed in absolute or relative terms, such as with regard to distances between such elements or locations or orientations of such elements with respect to one another.

In accordance with the present disclosure, an item may be recognized as complying with one or more relevant standards, requirements or criteria, or as authentic, standard or acceptable according to any method or by any means. For example, an item may be confirmed as compliant, authentic, standard or acceptable by opening a package in which the item was delivered and visually inspecting the item. Additionally, one or more dimensions or other physical attributes of the item (e.g., a length, a width, a height, a surface area, a volume or a mass of the item) may be determined and compared to known information regarding corresponding dimensions of items that are known to be compliant, authentic, standard or acceptable. The item may also be personally delivered to a fulfillment center, a warehouse or another like facility by a manufacturer, a merchant, a seller, a vendor or another exclusive source of the item, or designated as compliant, authentic, standard or acceptable by fiat.

Once the item is determined to be compliant, authentic, standard or acceptable by any method or means, one or more sets of baseline imaging data regarding the item (e.g., still or moving images of the item) may be captured, and a compact representation of a hull of the item, and one or more shapes or other features expressed on surfaces of the item, may be generated accordingly. The compact representation of the compliant, authentic, standard or acceptable item may then be used to determine whether other arriving items are likewise, compliant, authentic, standard or acceptable, or whether such other arriving items are non-compliant, counterfeit, substandard or unacceptable.

A determination of compliance, authenticity or acceptability based on a comparison of a hull and shapes of an arriving item, and hulls and shapes of known compliant, authentic, standard or acceptable items, including but not limited to a known compliant, authentic, standard or acceptable item that a source of the arriving item has attempted to pass the arriving item off as, may be made with varying degrees of certainty. For example, hulls and shapes of imaging data captured from compliant, authentic, standard or acceptable items may deviate, to slight or acceptable extents, from hulls and shapes generated from baseline imaging data of the compliant, authentic, standard or acceptable items, for varying reasons. Therefore, a predetermined tolerance interval or confidence level may be utilized in connection with hulls and shapes generated from baseline imaging data of compliant, authentic, standard or acceptable items, such that where a hull or shapes generated from imaging data of an arriving item does not exactly correspond to the hull or shape of an compliant, authentic, standard or acceptable item, but corresponds to the hull and shapes to within an acceptable tolerance interval or confidence level, the arriving item may, too, be deemed to be compliant, authentic, standard or acceptable.

Conversely, occasionally a compliant, authentic, standard or acceptable item may be released with temporary or special-purpose, non-standard packaging, e.g., a holiday edition of a food product or a specially labeled bottle of wine, that may include elements which correspond directly to elements of standard packaging of a known compliant, authentic, standard or acceptable item, and also include specific variations that are not mere deviations, but are expressly provided in order to differ from the standard packaging. In this regard, the non-standard packaging of an arriving item may be identified as deviating from the standard packaging ordinarily associated with compliant, authentic, standard or acceptable items, but need not be deemed non-compliant, counterfeit, substandard or unacceptable without further inspection or evaluation.

Once attributes of hulls or shapes expressed within imaging data associated with an arriving item are compared to attributes of hulls or shapes within imaging data associated with compliant, authentic, standard or acceptable items, information regarding the authenticity of the arriving item (e.g., whether the hulls or shapes of the arriving item sufficiently corresponds to those of one or more of the compliant, authentic, standard or acceptable items) may be used for any relevant purpose. For example, upon recognizing that the hulls and shapes of an arriving item correspond to the hulls and shapes of a compliant, authentic, standard or acceptable item with which the arriving item has been associated, the arrival of one of the compliant, authentic, standard or acceptable item may be registered, and the arriving item may be routed to a destination ordinarily associated with the compliant, authentic, standard or acceptable item. Likewise, upon recognizing that such hulls and shapes do not correspond to any compliant, authentic, standard or acceptable item in general, or to the compliant, authentic, standard or acceptable item with which the arriving item has been associated in particular, and the arriving item has been determined to be non-compliant, counterfeit, substandard or unacceptable, an alarm or other indication may be triggered, and one or more remedial actions may be instituted by the online marketplace or one or more third parties (e.g., relevant government authorities) against the merchant responsible for delivering the non-compliant, counterfeit, substandard or unacceptable item to the online marketplace.

Figure 2:
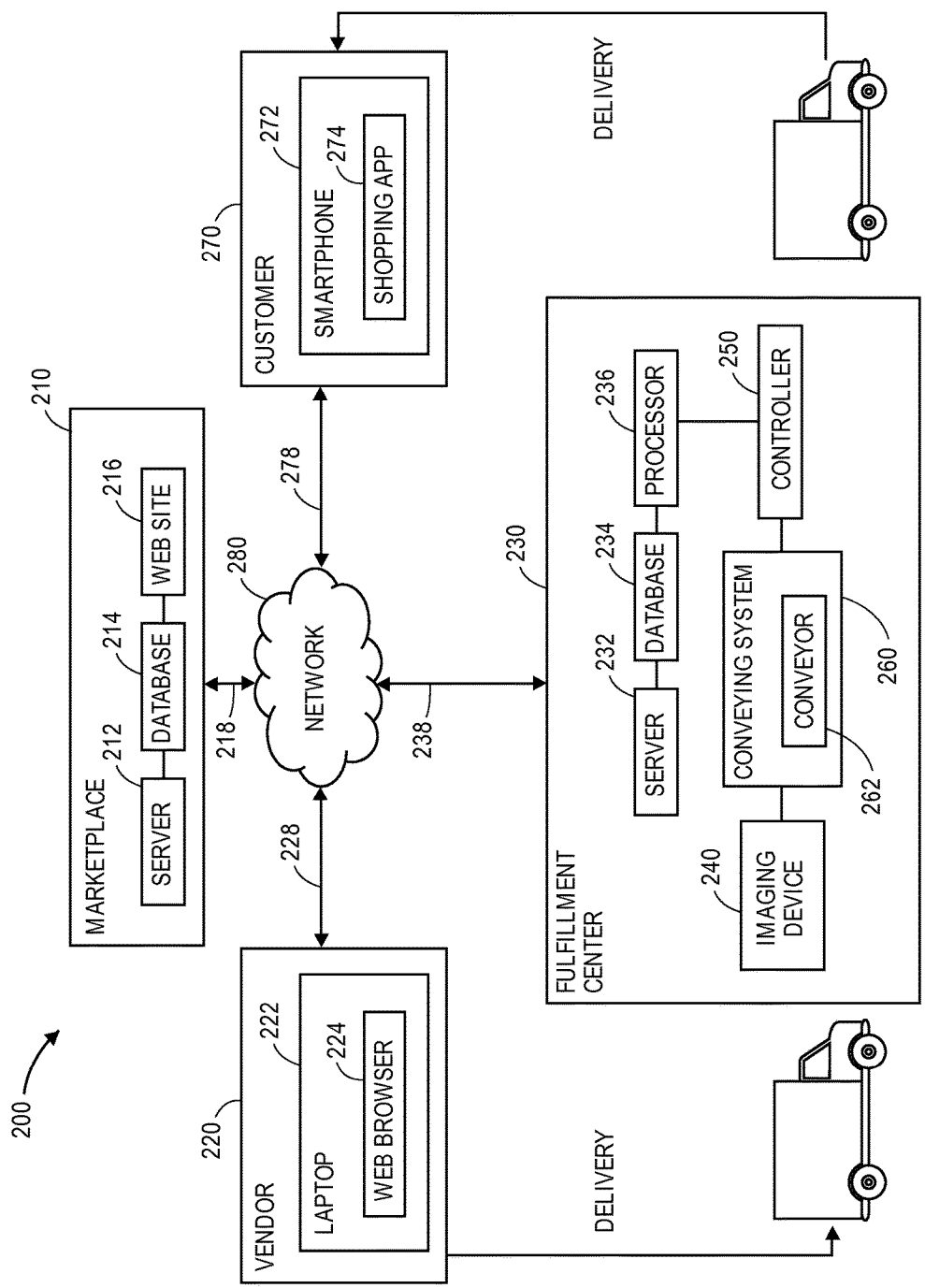
FIG. 2 is a block diagram of components of one system for inventory confirmation in accordance with embodiments of the present disclosure.

Referring to FIG. 2, a block diagram of components of one system 200 for inventory confirmation in accordance with embodiments of the present disclosure is shown. The system 200 includes a marketplace 210, a vendor 220, a fulfillment center 230 and a customer 270 that are connected to one another across a network 280, such as the Internet. Except where otherwise noted, reference numerals preceded by the number "2" shown in FIG. 2 indicate components or features that are similar to components or features having reference numerals preceded by the number "1" shown in FIGS. 1A through 1E.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and databases (or other data stores) 214 for hosting a web site 216. The marketplace 210 may be physically or virtually associated with one or more storage or distribution facilities, including but not limited to the fulfillment center 230. The web site 216 may be implemented using the one or more servers 212, which connect or otherwise communicate with the one or more databases 214 as well as the network 280, as indicated by line 218, through the sending and receiving of digital data. The servers 212 may cause the display of information associated with the web site 216 in any manner, e.g., by transmitting code such as Hypertext Markup Language (HTML), over the network 280 to another computing device that may be configured to generate and render the information into one or more pages and to display such pages on a computer display of any kind. Moreover, the database 214 may include any type of information regarding items that have been made available for sale through the marketplace 210, or ordered by customers from the marketplace 210.

The vendor 220 may be any entity or individual that intends to make one or more items available to customers, such as the customer 270, by way of the marketplace 210. The vendor 220 may operate one or more order processing and/or communication systems using a computing device such as a laptop computer 222 (as well as a tablet computer, a smartphone, a desktop computer or any other type or form of computing device) and/or software applications such as a browser 224, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230, or to the customer 270 or other destinations (not shown). Additionally, the vendor 220 may receive one or more items from manufacturers, merchants, sellers or other vendors (not shown), and may deliver one or more of such items to locations designated by the marketplace 210, such as the fulfillment center 230, for fulfillment and distribution to customers, or to the customer 270 directly. Furthermore, the vendor 220 may perform multiple functions. For example, the vendor 220 may also be a manufacturer, a merchant or a seller of one or more other items, and may also offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be, or may be operated by, a manufacturer, a merchant, a seller or a vendor.

The fulfillment center 230 may be any facility that is adapted to receive, store, process and/or distribute items on behalf of the marketplace 210. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236, that may be provided in the same physical location as the fulfillment center 210, or in one or more alternate or virtual locations, e.g., in a "cloud"-based environment. The fulfillment center 230 may also include stations for receiving, storing and distributing items to customers, such as one or more receiving stations, storage areas and distribution stations. The fulfillment center 230 further includes an imaging device 240, a controller 250, and a conveying system 260 having at least one conveyor 262.

The imaging device 240 may be any form of optical recording device that may be used to photograph or otherwise record images of structures, facilities or other elements within the fulfillment center 230, as well as the items within the fulfillment center 230, or for any other purpose. Such imaging devices 240 may capture one or more still or moving images, as well as any relevant audio signals or other information, within one or more designated locations within the fulfillment center 230, and may be connected to the server 232 or with one another by way of a wired or wireless connection that may be dedicated or comprise all or part of an internal network (not shown). Additionally, the imaging devices 240 may be adapted or otherwise configured to communicate with one another, or with the marketplace 210 or the marketplace server 212, the vendor 220 or the vendor laptop 222 or the customer 270 or customer smartphone 272, or to access one or more other computer devices by way of the network 280. Although the fulfillment center 230 of FIG. 2 includes a single box corresponding to one imaging device 240, those of ordinary skill in the pertinent arts will recognize that any number or type of imaging devices may be provided in accordance with the present disclosure, including but not limited to digital cameras or other optical sensors.

The controller 250 may be any type or form of electronic device or system configured to control the operation of the conveying system 260, the imaging device 240, or any other aspect of operations within the fulfillment center 230. The controller 250 may be in communication with one or more workers within the fulfillment center 230, or the various facilities and other components of the fulfillment center 230. The controller 250 may also be associated with one or more other computing devices or machines, and may communicate with the marketplace 210, the vendor 220 or the customer 270 over the network 280, as indicated by line 238, through the sending and receiving of digital data.

The controller 250 may generate instructions or commands based on information received from the imaging device 240 or the conveying system 260, or information received from the server 232, the processor 236, or any other external computing device via the network 280. For example, the controller 250 may transmit one or more control signals to motors associated with one or more aspects of the conveying system 260, including but not limited to the conveyor 262, as well as any divert mechanisms (not shown) or connections to other systems. Thus, in response to such control signals, an item may be placed onto the conveyor 262 or another element of the conveying system and transported to a predetermined destination, where the item may be removed from the conveyor 262 or another element of the conveying system 260, e.g., by one or more divert mechanisms, as necessary. The controller 250 may be associated with any form of motors, power sources or other components for operating the various machines or apparatuses within the fulfillment center 230, including but not limited to the imaging device 240 or various aspects of the conveying system 260.

The conveying system 260 may comprise one or more powered or powerless conveyors 262 that are provided for transporting objects, items or materials of varying sizes and shapes, and include any number of machines or elements for causing the motion or translation of such objects, items or materials from one location to another. Any form of mover, including but not limited to belts, chains, screws, tracks or rollers, may drive such machines or elements and the objects, items or materials may be transported within such conveying systems in a container or carrier, or on or within the mover itself. Such machines or elements may further include one or more pulleys, shafts, hubs, bushings, sprockets, bearings and other elements for causing a movement of a conveyor. Further, the conveying system 260 may convey objects, items or materials into one or more static or dynamic conveying apparatuses, which may include one or more machines or elements such as a bin, a chute, a cart, a truck or another like apparatus.

The fulfillment center 230 also includes one or more workers (not shown), who may be any designated personnel tasked with performing one or more tasks within the fulfillment center 230. Such workers may handle or transport items (e.g., any type or form of good, product, media or other tangible consumer article) within the fulfillment center 230, or operate one or more pieces of equipment therein (not shown). The workers may also operate one or more specific computing devices or machines for registering the receipt, retrieval, transportation or storage of items within the fulfillment center 230, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

The fulfillment center 230 may operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e g, manned aircraft or unmanned aircraft, such as drones), and preparing such items for storage or distribution to customers. The fulfillment center 230 may also include one or more predefined two-dimensional or three-dimensional storage areas including facilities, for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e g, manned aircraft or unmanned aircraft, such as drones). Alternatively, an item received at a receiving station of the fulfillment center 230 may be transferred directly to a distribution station for further processing, or "cross-docked," without first being placed into storage in an intermediate storage area.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," or a "customer," or like terms, may be automated steps performed by their respective computer systems, or implemented within software modules (or computer programs) executed by one or more general purpose computers. Moreover, those of ordinary skill in the pertinent arts would recognize that references to process steps or actions described herein as being performed by or relating to a "vendor" could also be performed by or relate to a manufacturer, a merchant or a seller, or another source of items. Those of ordinary skill in the pertinent arts would also recognize that process steps described as being performed by a "marketplace," a "vendor," a "fulfillment center," a "worker," or a "customer" may be typically performed by a human operator, but could, alternatively, be performed by an automated agent.

Similarly, those of ordinary skill in the pertinent arts will recognize that references to items as "compliant" are intended to indicate that the respective items comply with one or more relevant standards, requirements or criteria that apply to items in general, or to one or more specific items. The systems and methods of the present disclosure may thus be used to identify items as "compliant," or to distinguish such items from other items that are "not compliant," or "non-compliant," based on differences identified in imaging data (e.g., still or moving images) captured from such items. Likewise, those of ordinary skill in the pertinent arts will recognize that references to items as "authentic" (or "original") are intended to indicate that the respective items originate with or are obtained from recognized or legitimate sources, while references to items as "standard" or "acceptable" are intended to indicate that the respective items are of a commonly accepted level of quality or suitability. The systems and methods of the present disclosure may also be used to identify items as "authentic," "standard" or "acceptable," or to distinguish such items from other items that are "counterfeit," "substandard" or "unacceptable," respectively, based on differences identified in imaging data (e.g., still or moving images) captured from such items.

The marketplace 210, the vendor 220, the fulfillment center 230 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, a desktop computer, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the detection of counterfeit inventory arriving at a fulfillment center or like facility associated with an online marketplace, those of ordinary skill in the pertinent arts will recognize that the systems and methods disclosed herein are not so limited. Rather, the detection of counterfeit inventory in accordance with the present disclosure may be utilized in connection with any type or form of system for receiving, storing or distributing inventory, e.g., to review or audit inventory that has already been received from a vendor and is in storage, or inventory that has been placed onto a truck or other vehicle for delivery to a fulfillment center, a customer or another destination in accordance with the present disclosure.

As is discussed above, some embodiments of the present disclosure are directed to detecting counterfeit inventory, based on a comparison of a hull and/or shapes identified in images of an item or its packaging to hulls and/or shapes identified in images of other items that are known to be authentic. The hulls and/or shapes of authentic items may be defined from images captured as the authentic items arrive at the fulfillment center, either in real time or in near-real time, or in one or more batch processes upon a plurality of images of the authentic items (e.g., stock photographs or other images previously captured of such items).

Figure 3:
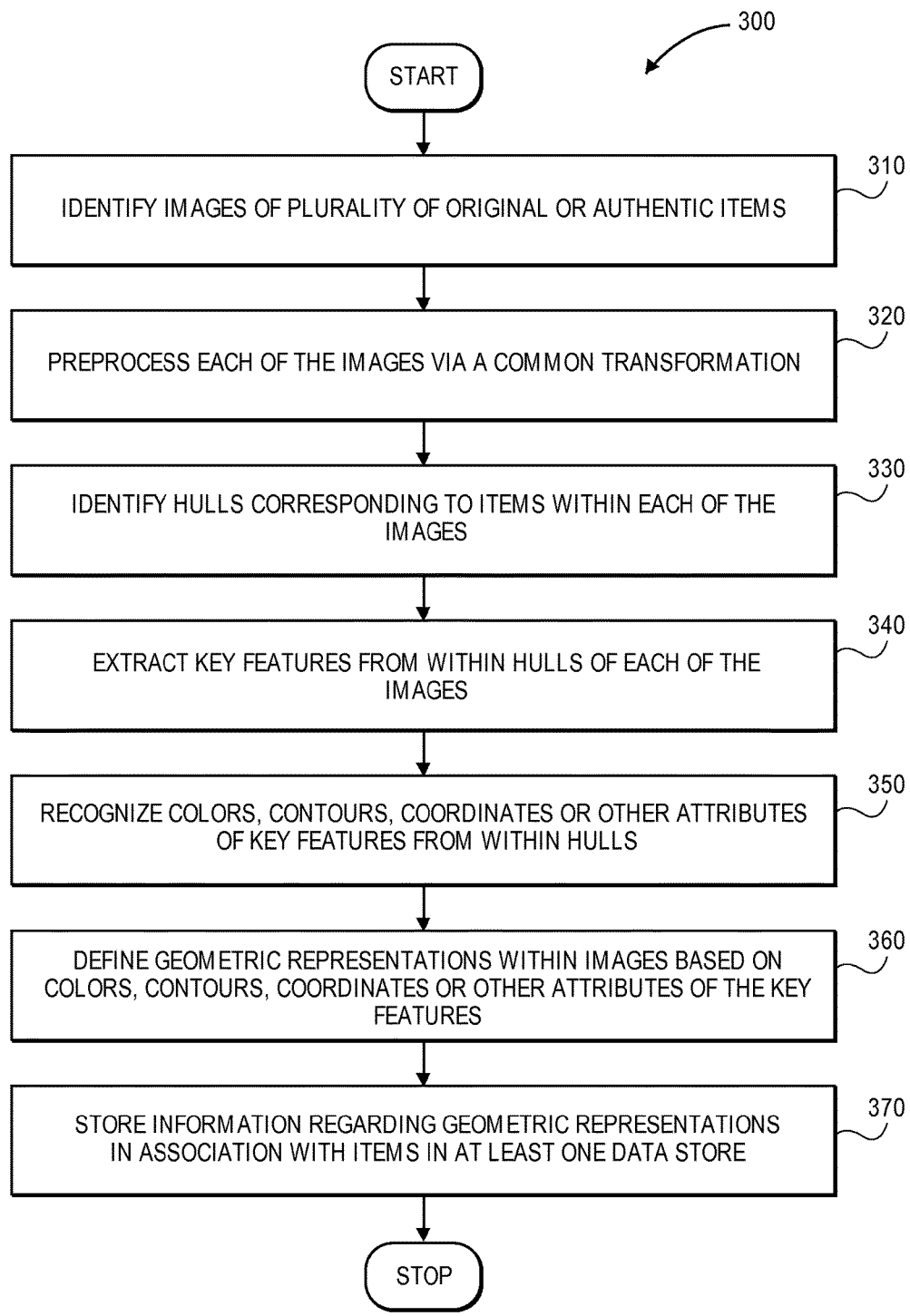
FIG. 3 is a flow chart of one process for inventory confirmation in accordance with embodiments of the present disclosure.

Referring to FIG. 3, a flow chart 300 representing one process for inventory confirmation in accordance with embodiments of the present disclosure is shown. At box 310, images of a plurality of original or authentic items are identified. For example, the images may depict or otherwise present one or more faces of such items, and may include or describe one or more markings or indicators provided such faces, including identifiers or fiducials which may be associated with items that comply with one or more relevant standards, requirements or criteria, or are confirmed to have been obtained from one or more authorized or legitimate sources. Such images may be stored in a data store or other medium, and may have been captured individually, e.g., by an imaging device such as the imaging device 140 of FIG. 1A, as the known original or authentic items arrived at a fulfillment center, a warehouse or like facility, or may have been received from an authorized source of the items and stored in one or more data stores.

At box 320, the images of the original or authentic images may be preprocessed according to a common transformation. To the extent that the images of the original or authentic items identified at box 310 are not captured from a common perspective or are not oriented in a common plane, each of the images may be transformed via a common transformation, e.g., a geometric transformation such as an affine transformation, or a transformation comprising at least one of a translation, a scaling, a reflection, a rotation or a shear of an image, to present at least one surface of each of the authentic items within the common plane. For example, referring again to FIG. 1B, the image 102 of the item 10 may be transformed or otherwise processed into the normalized image 104A, such that at least one aspect of the item 10, including the mark 12, is expressed in a plane perpendicular to an axis of a field of view.

At box 330, hulls corresponding to the original or authentic items are identified within each of the images. For example, the hulls corresponding to the packaging or other external surfaces of the original or authentic items may be identified according to one or more detection algorithms or techniques, including but not limited to one or more Canny edge detectors or algorithms, or one or more Sobel operators, algorithms or filters. Any system or method for detecting edges within an image may be used to identify a hull of an original or authentic item in accordance with the present disclosure. At box 340, key features within the hulls are extracted from the images. Such features may correspond to aspects of the hulls identified at box 330, or to one or more markings on such hulls, e.g., any labels, characters, trademarks or other indicia thereon.

At box 350, colors, contours, coordinates or other attributes of the key features, including but not limited to any straight or curvilinear lines or points associated therewith corresponding to the key features extracted from the images at box 340, are recognized. At box 360, one or more geometric representations are defined within such images based on the colors, contours, coordinates or other attributes. For example, the key features may include sections having one or more unique colors that may be defined by contours corresponding to one or more polygons, conic sections, or any other shape formed from straight or curvilinear lines extending between points, including but not limited to circles, ellipses, rectangles, squares, triangles, pentagons or hexagons.

At box 370, information regarding the attributes of the geometric representations within each of the images is stored in association with information regarding the original or authentic items, and the process ends. For example, coordinates corresponding to the shape of the package, e.g., the hull of the original or authentic item, may be determined and stored, along with coordinates of centers of circles, focal points of ellipses, corners or other vertices of polygons, or like points associated with any type or form of shape or geometric element. Similarly, dimensions of sides or aspects of such shapes or elements thereof, including lengths of sides, axes or other lines or line segments, or angles associated with or subtended by arcs or other curvilinear portions of such shapes or elements, may also be determined and stored. Additionally, equations or formulas for generating such shapes or elements may also be determined and stored. Finally, metrics or alphanumeric identifiers (e.g., hexadecimal descriptions or RGB model codes) of colors shown in the images may also be determined and stored.

Subsequently, any geometric representations on the package may be located and determined. For example, a circle or a portion thereof (e.g., an arc) may be identified with respect to coordinates of a center and a length of a radius, as well as an angle subtended by an arc thereof where the arc is less than a complete circle. An ellipse may be defined with respect to coordinates of each of a pair of focal points, and the sum of the distances between each point on the ellipse and each of the focal points. A polygon (e.g., a triangle, a rectangle or other quadrilateral, a pentagon, a hexagon or any other shape bounded by line segments) may be defined with respect to coordinates of each of the corners of the shape, as well as lengths or distances between such corners. A parabola may be defined with respect to coordinates of a focus, an equation or coordinates corresponding to a directrix, or an equation defining the distances between the focus and the directrix, while a hyperbola may be defined with regard to coordinates of a center or a focal point, or equations defining major or minor axes. Colors or other attributes of such representations, e.g., colors of the lines defining such representations or colors filling portions between such lines, may also be identified.

Figure 4:
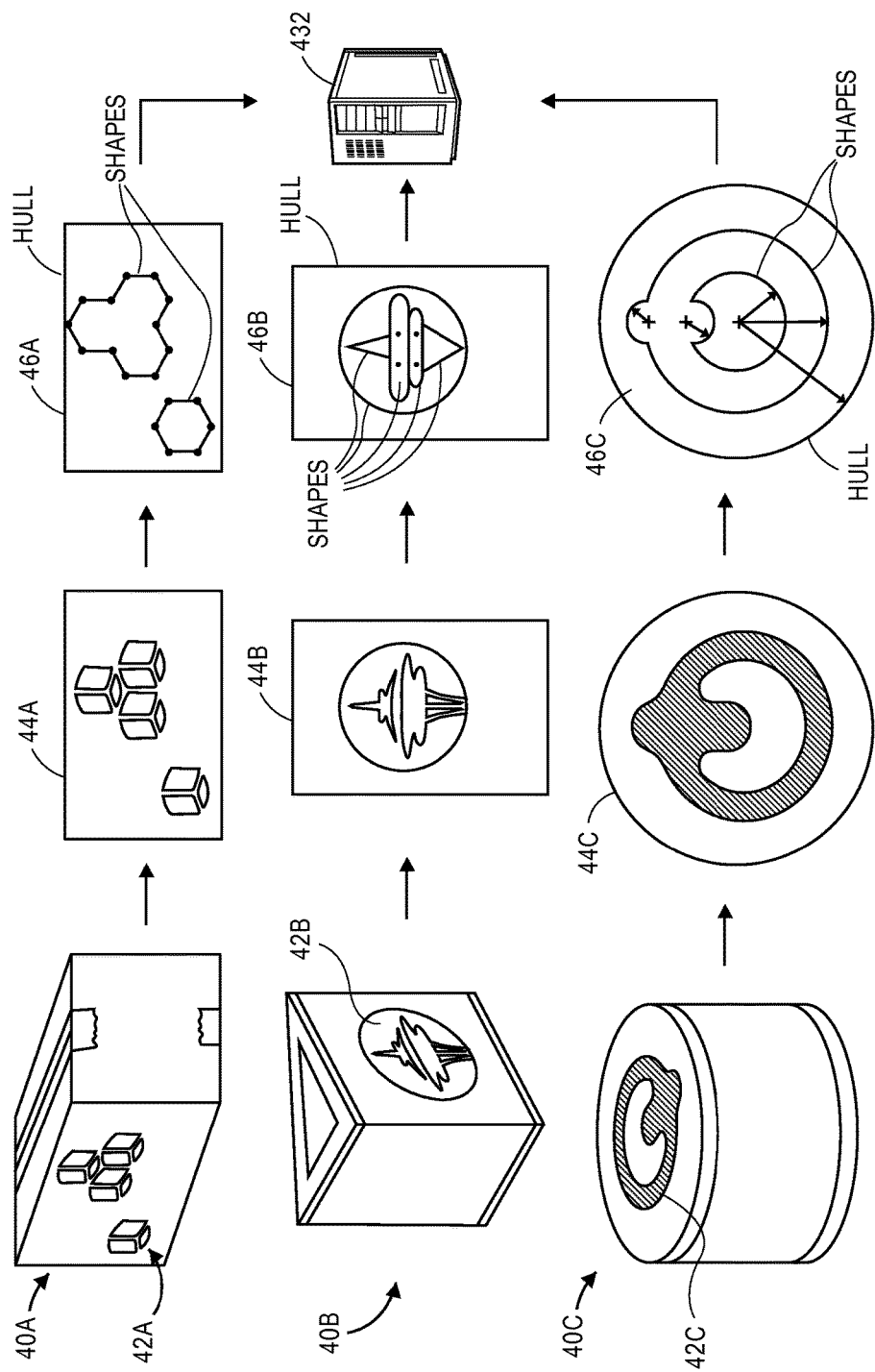
FIG. 4 is a view of data considered by embodiments of systems or methods for inventory confirmation in accordance with embodiments of the present disclosure.

Referring to FIG. 4, the generation of geometric representations of hulls and shapes from imaging data (e.g., still or moving images) captured from authentic items in accordance with the present disclosure is shown. Except where otherwise noted, reference numerals preceded by the number "4" shown in FIG. 4 indicate components or features that are similar to components or features having reference numerals preceded by the number "2" shown in FIG. 2, or by the number "1" shown in FIGS. 1A through 1E.

As is shown in FIG. 4, items 40A, 40B, 40C each have one or more labels 42A, 42B, 42C (or characters, trademarks or other indicia) provided thereon. The items 40A, 40B, 40C and/or their packaging may have any shape or form, including rectangular solids or prisms, triangular solids or prisms, or cylinders, respectively. Alternatively, items or packaging of any shape may be evaluated in accordance with the present disclosure, including but not limited to spheres, pyramids, cones, or any other regular or irregular shape.

As is also shown in FIG. 4, images 44A, 44B, 44C may be captured of one or more surfaces of the items 40A, 40B, 40C, and normalized or otherwise processed such that the one or more surfaces including the labels 42A, 42B, 42C are expressed in a plane perpendicular to the axis of the field of view. As is further shown in FIG. 4, based on the normalized images 44A, 44B, 44C, compact representations 46A, 46B, 46C including a hull corresponding to exterior shapes and contours of the items 40A, 40B, 40C, and shapes associated with the labels 42A, 42B, 42C, may be defined and stored in a server 432 or other computing device or network having one or more data stores. For example, the compact representation 46A describes a hull defined by a side surface of the item 40A and a polygon formed from a number of line segments consistent with the label 42A, which includes a perspective view of four cubes. The compact representation 46B describes a hull corresponding to a side surface of the item 40B and a number of shapes, including a pair of triangles and a pair of ellipses approximating the structural feature described in the label 42B. The compact representation 46C describes a hull corresponding to a top surface of the item 40C, and circles or circular elements consistent with the shapes shown in the label 42C.

Figure 5:
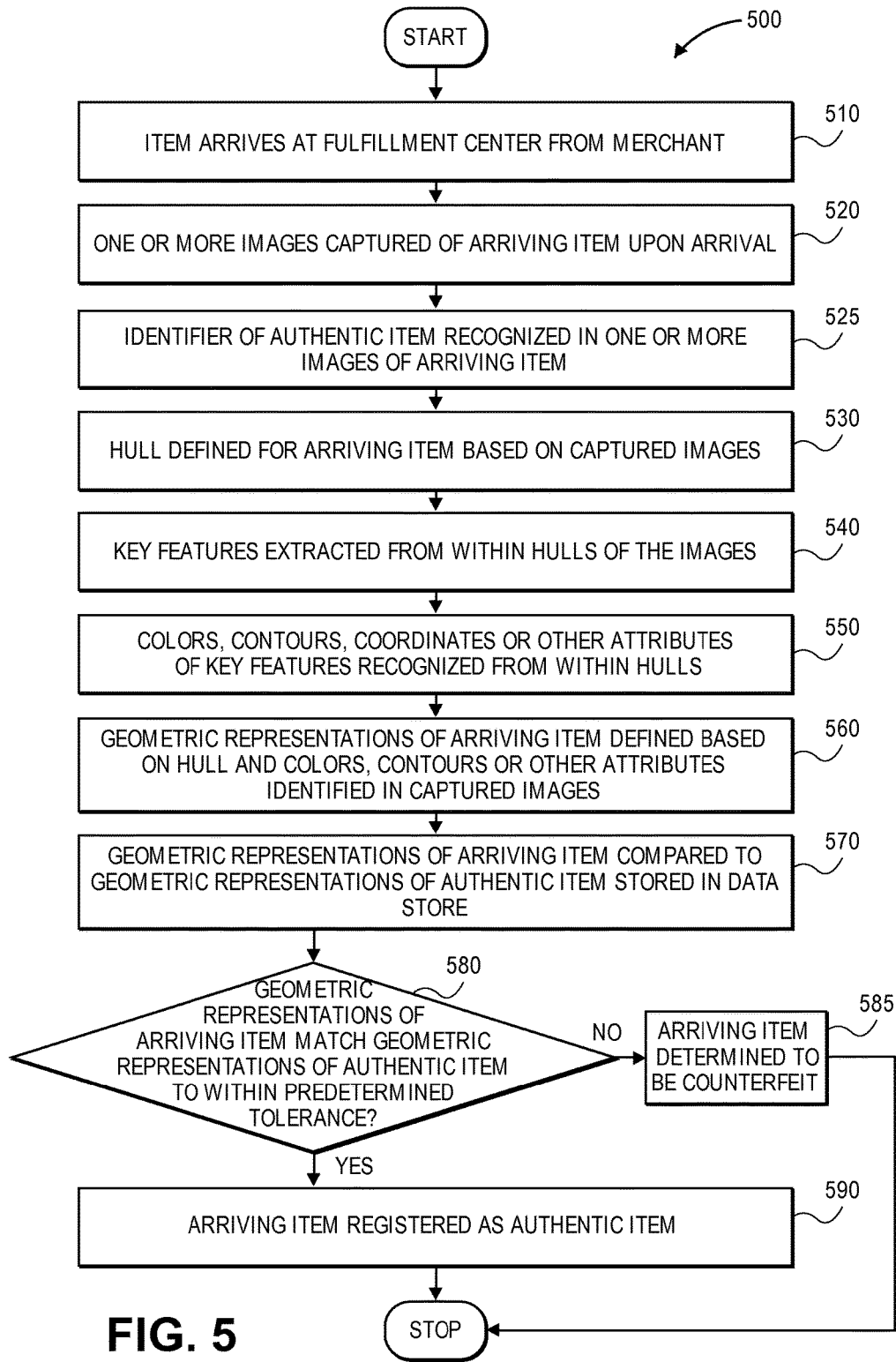
FIG. 5 is a flow chart of one process for inventory confirmation in accordance with embodiments of the present disclosure.

Once images of known compliant, authentic, standard or acceptable items have been processed to identify geometric representations such as hulls and one or more shapes (e.g., polygons, conic sections or any other shape) shown on one or more surfaces of the authentic items, information regarding such geometric representations (e.g., attributes such as coordinate points, dimensions, angles, lines or line segments and the like) of the compliant, authentic, standard or acceptable items may be compared to information regarding geometric representations identified in imaging data captured from arriving items at a fulfillment center, a warehouse or another like facility, in order to determine whether the arriving items comply with one or more relevant standards, requirements or criteria, or are confirmed to have been obtained from one or more authorized or legitimate sources. Referring to FIG. 5, a flow chart 500 representing one process for inventory confirmation in accordance with embodiments of the present disclosure is shown. At box 510, an item arrives at a fulfillment center from a merchant. The item may arrive at a receiving station associated with the fulfillment center in the air, on land and sea, e.g., by manned or unmanned cargo aircraft, car, truck or ship.

At box 520, one or more images of the arriving item are captured upon its arrival. For example, referring again to FIG. 1A, the imaging device 140 may capture one or more still or moving images and/or other imaging data of the item 10 as the item travels along the conveyor 162 from an origin to a destination. The images may be captured from a single imaging device (e.g., a digital camera) in a fixed location and/or orientation, or using one or more imaging devices from fixed or moving perspectives. At box 525, one or more identifiers of an authentic item are recognized in one or more images of the arriving item. The identifiers may take any form, including but not limited to images, bar codes (e.g., one-dimensional codes or two-dimensional codes, such as QR codes), bokodes, characters, numbers, symbols, or colors that are located within the images captured at box 520. At box 530, a hull is defined for the arriving item based on one or more of the captured images. For example, one or more edge detection techniques may recognize an outline of the arriving item and/or the container or packaging in which the arriving item is provided using imaging data captured using one or more imaging devices.

At box 540, key features are recognized from within the portions of the images corresponding to the hulls. Such key features may correspond to aspects of the item or its packaging, or to one or more labels, characters, trademarks or other indicia. At box 550, colors, contours, coordinates or other attributes of such key features are recognized, and at box 560, one or more geometric representations corresponding to such key features may be defined based on the hull and the colors, contours, coordinates or other attributes identified in the captured images. The geometric representations may be defined based on locations of one or more points of interest such as centers, focal points, corners or vertices, which may be joined or associated with one or more straight or curvilinear lines, or on any other attributes of the points of interest (e.g., associated colors).

At box 570, geometric representations of the arriving item are compared to geometric representations of the authentic item that are stored in a data store. For example, as is shown in FIG. 3 and FIG. 4, images of items that are known to be authentic may be analyzed in order to identify a hull and any shapes expressed therein, and information or data regarding such hulls and shapes (e.g., coordinates associated with key elements of the hulls and shapes, as well as labels or identifiers of such hulls and shapes, and lengths, dimensions, angles or other attributes of the hulls and shapes, or distances between such hulls and shapes) may be stored in one or more data stores. Subsequently, as an item arrives at the fulfillment center, a hull of the item's packaging and one or more shapes thereon may be defined based on such images and compared to the information or data regarding a hull and any shapes on the one of the authentic items associated with the identifier recognized on a surface of the arriving item at box 525.

At box 580, whether the geometric representations of the arriving item match the geometric representations of the authentic item to within a predetermined tolerance is determined. For example, whether information and data regarding the orientation and alignment of the hull of the arriving item, and of any shapes shown on the arriving item (e.g., coordinates associated with the item or its packaging, or any points, lines, polygons or other shapes shown thereon) correspond to information or data regarding the orientation or alignment of a hull or shapes of the item associated with the identifier recognized at box 525, which is known to be authentic. If the attributes of the arriving item correspond to one or more of the attributes of a known authentic item, to within a predetermined tolerance or confidence level, then the process advances to box 590, where the arriving item is registered as one of the authentic item identified at box 525, and the process ends. If the attributes of the arriving item do not correspond to attributes of any of the authentic items, however, then the process advances to box 585, where the arriving item is determined to be counterfeit, and the process ends.

Subsequently, after an arriving item has been registered as compliant, authentic, standard or otherwise acceptable, or determined to be non-compliant, counterfeit, substandard or otherwise unacceptable, information regarding the arrived item may be used for any purpose. For example, an authentic item may be routed to an appropriate destination, e.g., a predetermined storage area associated with items of the same type as the authentic item, or to a distribution station for delivery to a customer. Alternatively, a counterfeit item may be evaluated for further processing, or returned to the merchant that provided the counterfeit item to the fulfillment center.

Figure 6A:
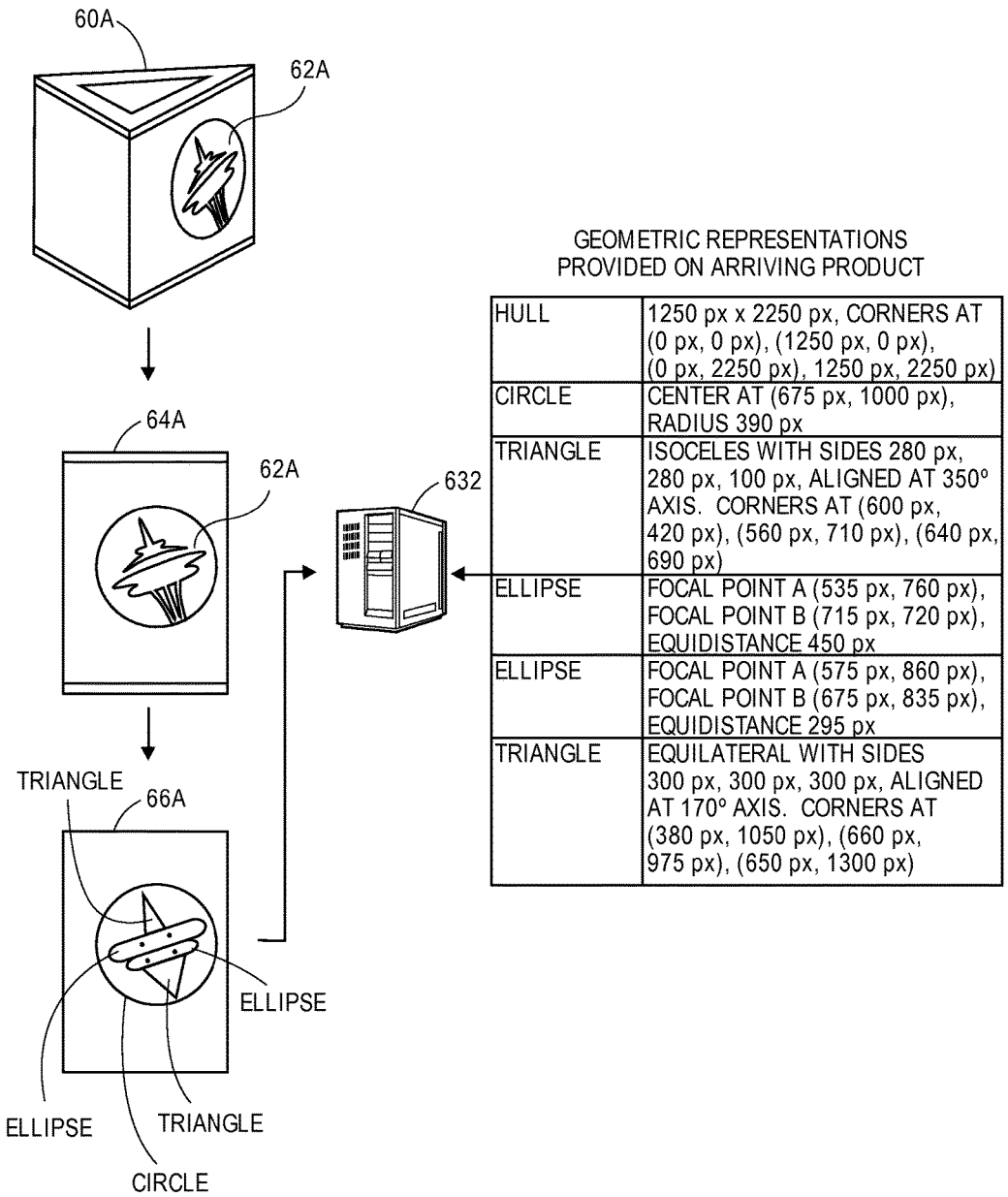
FIGS. 6A and 6B are views of data considered by embodiments of systems or methods for inventory confirmation in accordance with embodiments of the present disclosure.
Figure 6B:
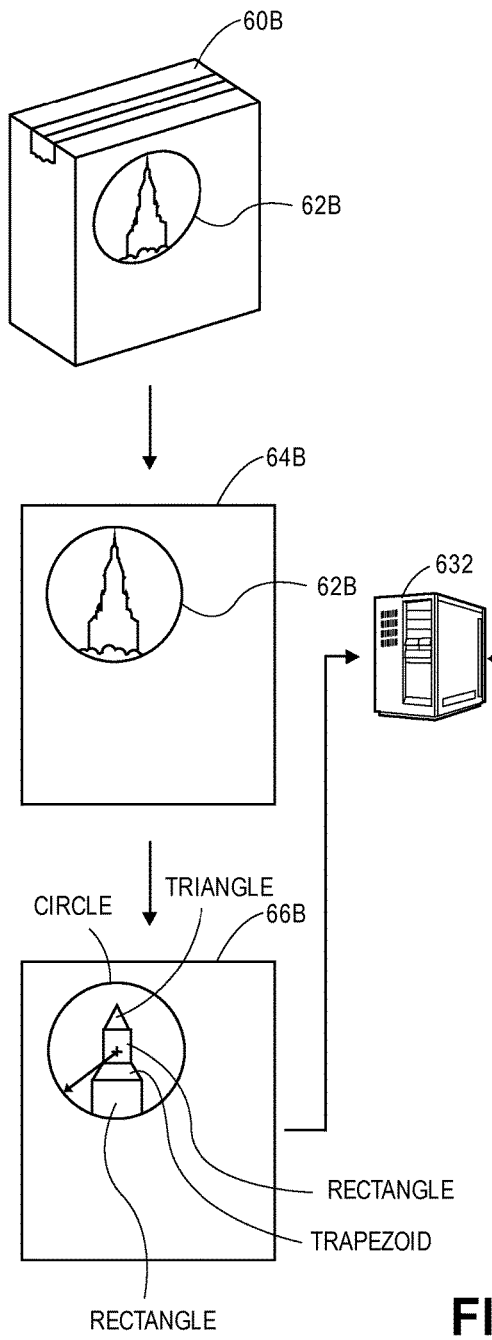

As is discussed above, an item may be determined to be compliant, authentic, standard or otherwise acceptable when attributes of a hull and/or shapes provided on the item correspond with attributes of a hull or shapes provided on an item that is known to be compliant, authentic, standard or otherwise acceptable. Referring to FIGS. 6A and 6B, data that may be considered by embodiments of systems or methods for inventory confirmation is shown. Except where otherwise noted, reference numerals preceded by the number "6" shown in FIG. 6A or FIG. 6B indicate components or features that are similar to components or features having reference numerals preceded by the number "4" shown in FIG. 4, by the number "2" shown in FIG. 2, or by the number "1" shown in FIGS. 1A through 1E.

As is shown in FIG. 6A, an arriving item 60A having a label 62A (or one or more characters, trademarks or other indicia) provided thereon may be photographed or otherwise evaluated using an imaging device or like sensor, and a compact representation 66A of a hull and shapes or other features provided on the item 60A (e.g., shapes corresponding to the label 62A or any other indicia provided thereon) may be derived from one or more images 64A of the item 60A, which may be normalized or otherwise preprocessed, as necessary. For example, as is shown in FIG. 6A, the compact representation 66A includes a circle provided on a right side thereof, along with an isosceles triangle, a large ellipse, a small ellipse and an equilateral triangle within the circle. After the compact representation 66A has been defined from the image 64A, the compact representation 66A of the item 60A, and data regarding any of the geometric representations provided thereon (e.g., a hull and/or one or more shapes) may then be provided to a server 632 or other computing device having access to compact representations of other items that are known to be authentic (or compliant, standard or acceptable), or have been confirmed to have arrived from one or more authorized sources. The data may describe or relate to colors, contours, coordinates or other attributes of such geometric representations, or any other relevant factors.

As is shown in FIG. 6B, an arriving item 60B having a label 62B provided thereon may be photographed or otherwise evaluated using an imaging device or like sensor, and a compact representation 66B of a hull and shapes or other features provided on the item 60B may be derived from one or more images 64B of the item 60B, which may be normalized or preprocessed, as necessary. For example, as is shown in FIG. 6B, the compact representation 66B includes a circle provided near an upper left corner thereof, along with an equilateral triangle, a rectangle, an isosceles trapezoid and a rectangle within the circle, with a lower edge of the rectangle being subtended by the circle. After the compact representation 66B has been defined from the image 64B, the compact representation 66B of the item 60B, and data regarding any of the geometric representations provided thereon (e.g., a hull and/or one or more shapes), may then be provided to the server 632.

The compact representations 66A, 66B of the attributes of the hulls and/or shapes provided on the arriving items 60A, 60B may be compared to compact representations of one or more other items in series or in parallel, and at substantially high rates of speed, including but not limited to compact representations of authentic items that sources of the arriving items 60A 60B have passed such items 60A, 60B off as. By breaking down actual images of the arriving items 60A, 60B and of one or more authentic (or compliant, standard or acceptable items, into geometric descriptions of the features of the items or their packaging or of one or more labels or other indicia provided thereon as a hull with one or more shapes, e.g., in terms of identifiers or other descriptors (e.g., square, circle, triangle), geometric variables (e.g., radius, angle, length, height, width) or the like, including coordinates of relevant points and descriptions of straight or curvilinear lines connecting such points and any polygons or other shapes formed thereby, the server 632 may compare the arriving items 60A, 60B to one or more authentic (or compliant, standard or acceptable items quickly and effectively.

Thus, the arriving items 60A, 60B may be confirmed as authentic (or compliant, standard or acceptable based on comparisons of the compact representations 66A, 66B to compact representations of other items, e.g., authentic items with which the arriving items 60A, 60B have been associated by their respective sources, within a matter of seconds. Conversely, as is also discussed above, an arriving item may be determined to be potentially counterfeit (or non-compliant, substandard or unacceptable) when attributes of a hull and/or shapes provided on the item do not correspond with any attributes of any hulls or shapes provided on items that are known to be authentic. In such a scenario, the arriving item may be pulled from inventory and evaluated for further processing.

Referring to FIGS. 7A and 7B, data that may be considered by embodiments of systems or methods for inventory confirmation is shown. Except where otherwise noted, reference numerals preceded by the number "7" shown in FIG. 7A or in FIG. 7B indicate components or features that are similar to components or features having reference numerals preceded by the number "6" shown in FIG. 6A or in FIG. 6B, by the number "4" shown in FIG. 4, by the number "2" shown in FIG. 2, or by the number "1" shown in FIGS. 1A through 1E.

As is shown in FIG. 7A and FIG. 7B, compact representations of arriving items and their associated data, viz., the compact representations 66A, 66B and associated data of the items 60A, 60B shown in FIGS. 6A and 6B, may be compared to compact representations of authentic items, including but not limited to an authentic item 70 with which the arriving items 60A, 60B have been associated, e.g., based on an identifier or other marking provided thereon, or other information provided by merchants or other sources of the arriving items 60A, 60B. As is shown in FIG. 7A, a compact representation 76, data and an image of the authentic item 70 with which the item 60A has been associated are shown. Because the compact representation 66A of the arriving item 60A of FIG. 6A deviates only slightly from the compact representation 76 of the item 70, in that the circles are shown in marginally different positions and the shapes provided therein are shown in slightly different alignments, the item 60A of FIG. 6A may be determined to be authentic.

As is shown in FIG. 7B, because the compact representation of 66B of the arriving item 60B of FIG. 6B deviates substantially from the compact representation 76 of the item 70, in that the circles are shown in significantly different positions, and include a number of different shapes having varying sizes, the item 60B of FIG. 6B may be determined to be counterfeit. For example, whereas the compact representation 66B of the arriving item 60B of FIG. 6B includes a circle having a single equilateral triangle, a rectangle, an isosceles trapezoid and a rectangle bounded by a subtended arc of the circle, the compact representation 76 of the item 70 includes a circle having a pair of isosceles triangles bounding a pair of ellipses therein.

A comparison of a compact representation of an arriving item to a compact representation of a compliant, authentic, standard or acceptable item may be performed in any manner. For example, the individual geometric representations of attributes within an image may be compared to corresponding representations of attributes of images of a compliant, authentic, standard or acceptable item in series, such as is shown in FIG. 1E. In this regard, geometric representations of shapes or other features within an image of an arriving item may be individually identified, and a compact representation of an image of a compliant, authentic, standard or acceptable item may be searched in order to determine whether a corresponding geometric representation of each of the shapes or features may be found therein. Alternatively, the geometric representations of shapes or other features within an image of a compliant, authentic, standard or acceptable item may be individually identified, and a compact representation of an image of an arriving item may be searched in order to determine whether a corresponding geometric representation of each of the shapes or features may be found therein.

Moreover, a comparison of a compact representation of an arriving item to a compact representation of a compliant, authentic, standard or acceptable item may be subject to any type or form of threshold or other consideration. For example, a difference between the locations or placements of shapes or other features within an item may be subject to a first threshold (e.g., an absolute or relative difference that may not be exceeded if an item is to be deemed authentic), while a difference between the sizes of such shapes or other features may be subject to a second threshold, and a difference between the angular alignment or configuration of such shapes or other features may be subject to a third threshold. The thresholds may be either qualitative or quantitative, e.g., such that a square provided on an arriving item may be deemed as acceptable for or consistent with a triangle but not a circle on a compliant, authentic, standard or acceptable item, or that a difference in a location or a placement of a shape or another feature in one area of an image may be acceptable, while the same difference in the location or the placement of the shape or the other feature in another area of the image may be unacceptable. Furthermore, a single threshold may be defined as a sum, or based on an aggregate or net effect, of multiple differences in attributes shown in images of an arriving item, and in a compliant, authentic, standard or acceptable item, in accordance with the present disclosure.

As is discussed above, a determination as to whether an item is compliant, authentic, standard or acceptable, or is non-compliant, counterfeit, substandard or unacceptable, may be made based on iterative comparisons of attributes of a hull and/or shapes or other representations provided on the item to attributes of hulls, shapes or other representations of other items that are known to be compliant, authentic, standard or acceptable. The comparison may be made subject to one or more tolerance intervals, confidence levels or other thresholds. Depending on the values or amounts of such confidence levels or thresholds, deviations between attributes of hulls, shapes or other representations may result in a determination that an item is compliant, authentic, standard or acceptable, or that the item is non-compliant, counterfeit, substandard or unacceptable. For example, where a threshold for compliance is low, slight deviations between attributes of an arriving item and an authentic item need not trigger a determination that the arriving item is counterfeit, and only substantial deviations between the attributes of the arriving item and the known authentic item may cause the arriving item to be flagged as potentially counterfeit. Conversely, where thresholds for compliance are high, slight deviations between attributes of the arriving item and the authentic item may result in a determination that the arriving item is counterfeit.

Referring to FIG. 8, a flow chart 800 representing one process for inventory confirmation in accordance with embodiments of the present disclosure is shown. At box 810, an item identified as an original authentic item arrives from a merchant, e.g., at a fulfillment center, a warehouse or another like facility. The item may be so designated by the merchant, or by a supplier or other source of the item, and identified as such by any means, including an express statement made by the merchant, or based on an interpreted marking or label provided on a surface of the item, such as a bar code or a fiducial marking. At box 820, a hull and shapes are defined from images of the arriving item, and at box 830, attributes of the hull and the shapes, e.g., centers and radii of circles, focal points and distances thereto of ellipses, vertices and dimensions of rectangles, triangles or other polygons, may be determined. At box 840, attributes of hulls and shapes of authentic items are identified in a data store. For example, geometric representations within stock images of authentic items may be recognized and attributes of such representations may be determined and stored according to one or more processes, such as the process shown in the flow chart 300 of FIG. 3, or as is shown in FIG. 4.

At box 850, the attributes of the hulls and shapes of the arriving item are compared to the attributes of the hulls and shapes of the authentic item with which the arriving item has been associated, as identified in box 810. The comparison of such attributes may be performed on multiple levels with regard to the hulls of the arriving item and the authentic item, as well as the various shapes that may be provided on the arriving item and the first known authentic item. If the each of the attributes of the arriving item corresponds to each of the attributes of the authentic item, to within one or more predetermined tolerances, then the arriving item may be registered as one of the first known authentic item. First, at box 852, whether the hulls of the arriving item and the authentic item match to within a predetermined tolerance is determined. The predetermined tolerance may be expressed in any manner. For example, a compact representation including information or data regarding the outer contours of the arriving item and/or its packaging may be compared to a compact representation including information or data regarding the outer contours of the authentic item, including but not limited to their respective dimensions, slopes or faces. If the hulls of the arriving item and the authentic item do not match to within the predetermined tolerance, then the process advances to box 870, where the arriving item is determined to be counterfeit, and the process ends.

If the hulls of the arriving item and the authentic item match to within the predetermined tolerance, however, then the process advances to box 854, where whether the types of shapes provided on the arriving item and the authentic item match to within a predetermined tolerance is also determined. In this regard, the predetermined tolerance may be defined qualitatively or quantitatively, or in any other manner that enables a qualitative or quantitative determination that the types of shapes of the arriving item and the authentic item match or do not match with one another.

For example, if a compact representation of the arriving item describes a circle, and the compact representation of the authentic item describes a circle, then the types of shapes provided on both the arriving and the first known authentic item are determined to match. If the compact representation of the arriving item describes a circle, and the compact representation of the authentic item describes a square, then the types of shapes provided on both the arriving and the first known authentic item are determined to not match. If the compact representation of the arriving item describes a circle, and the compact representation of the authentic item describes a slightly elliptical shape, then the differences between the circle on the arriving item and the ellipse on the authentic item may be compared to the predetermined tolerance in order to determine whether the types of shapes on the arriving item and the authentic item sufficiently match and whether the arriving item is one of the authentic item, or is counterfeit.

If the types of the shapes of the arriving item and the authentic item do not match to within the predetermined tolerance, then the process advances to box 870, where the arriving item is determined to be counterfeit, and the process ends.

If the types of the shapes of the arriving item and the authentic item match to within the predetermined tolerance, however, then the process advances to box 856, where whether the dimensions of such shapes match to within a predetermined tolerance is also determined. In this regard, the predetermined tolerance may be expressed in any manner, including an absolute length or angle associated with such dimensions, or a percentage or relative relationship to such dimensions.

For example, if a compact representation of the arriving item describes a square on the arriving item having sides of four centimeters (4 cm), and the compact representation of the authentic item describes a square on the authentic item having sides of four-and-one-half centimeters (4.5 cm), then the dimensions of such shapes may be determined to match where the predetermined tolerance is one centimeter (1 cm), but not where the predetermined tolerance is one-quarter centimeter (0.25 cm). Similarly, the dimensions of such shapes may be determined to match where the predetermined tolerance is twenty percent (20%), but not where the predetermined tolerance is ten percent (10%).

If the dimensions of the shapes of the arriving item and the authentic item do not match to within the predetermined tolerance, then the process advances to box 870, where the arriving item is determined to be counterfeit, and the process ends.

If the dimensions of the shapes of the arriving item and the authentic item match to within the predetermined tolerance, however, then the process advances to box 858, where whether the coordinates of the shapes match to within a predetermined tolerance is also determined. In this regard, the predetermined tolerance may also be expressed in any manner. For example, where the arriving item includes a right triangle having vertices in specific locations (e.g., one inch below and one inch to the right of an edge of a hull, five inches below and one inch to the right of the edge of the hull, and five inches below and four inches to the right of the edge of the hull), and the authentic item includes vertices in specific locations, the locations of the vertices of the right triangle on the arriving item may be compared to the locations of the vertices of the right triangle on the first known authentic item in order to determine whether the right triangles are both similar and congruent to one another, and in the same location. If the coordinates of the shapes of the arriving item and the authentic item match to within the predetermined tolerance, however, then the process advances to box 860, where the item is determined to be authentic, and the process ends.

Accordingly, some embodiments of the present disclosure may determine whether an item is compliant, authentic, standard or acceptable, or is non-compliant, counterfeit, substandard or unacceptable, by comparing attributes of a hull of the item, and of shapes provided on the item, to attributes of hulls and shapes of other items that are known to be compliant, authentic, standard or acceptable. Some of the attributes that may be compared include, but are not limited to, surface features of the item and/or its packaging (e.g., surface features corresponding to a hull of the item), as well as types, dimensions and locations (e.g., coordinates) of shapes provided on the item. If the attributes of the hull and/or shapes of the item correspond to attributes of hulls and/or shapes of one or more items that are known to be compliant, authentic, standard or acceptable, within one or more predetermined tolerances, confidence levels, thresholds or other limits, then the item may also be determined to be compliant, authentic, standard or acceptable. If the attributes of the hull and/or shapes of the item do not correspond to those of hulls or shapes of any items that are known to be compliant, authentic, standard or acceptable, however, then the item may be identified as potentially non-compliant, counterfeit, substandard or unacceptable, and one or more related actions may be taken regarding the item. For example, the item may be evaluated by workers or other automatic processes in order to determine whether the item is, in fact, counterfeit or authentic. Once an item has been determined to be non-compliant, counterfeit, substandard or unacceptable, however, the item may be returned to the source from which it was received, or one or more authorities (e.g., governmental officials or agencies associated with commerce) may be contacted regarding the item, and further investigation may be undertaken.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein refer to determining whether arriving items (e.g., items received at a fulfillment center, a warehouse or another like facility) are authentic or counterfeit, those of ordinary skill in the pertinent arts will recognize that such systems and methods are not limited for use on items arriving at a given destination. For example, some embodiments of the present disclosure may be used to audit items that have already arrived at a fulfillment center, a warehouse or another like facility, in order to determine whether each is authentic or counterfeit. Additionally, some other embodiments may be utilized by customers or other individuals or entities that purchase or otherwise obtain items, e.g., from a merchant or a fulfillment center, in order to determine whether such items are authentic or potentially counterfeit.

Moreover, although some of the embodiments disclosed herein may identify an item as non-compliant, counterfeit, substandard or unacceptable where attributes of a compact representation of an image of the item is inconsistent with attributes of a compact representation of an image of a known compliant, authentic, standard or acceptable item, the systems and methods are not so limited. For example, an item may be identified as non-compliant, counterfeit, substandard or unacceptable where attributes of a compact representation of an image of the item are consistent with attributes of a compact representation of an image of a known non-compliant, counterfeit, substandard or unacceptable item.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an application-specific integrated circuit, or ASIC, which can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
    an imaging device;
    a conveyor defining a direction of travel along an axis, and conveying a first item in the direction of travel;
    a memory storing one or more computer-executable instructions; and
    a computing device in communication with the memory, the imaging device and the conveyor, wherein the computing device is configured with the one or more computer-executable instructions to at least:
    cause, using the imaging device, capture of at least a first image of a first packaging of the first item on the conveyor;
    extract data regarding a first plurality of features provided on the first packaging of the first item from at least the first image;
    define a first compact representation of a first portion of the first packaging of the first item based at least in part on the extracted data regarding the first plurality of features, wherein the first compact representation comprises information regarding a first shape provided on the first portion of the first packaging of the first item and information regarding a second shape provided on the first portion of the first packaging of the first item, the information regarding the first shape comprising information regarding at least one of a first contour, a first line segment, a first color or a first location of the first shape;
identify a second item designated as associated with the first item;
identify a second compact representation of a second portion of a second packaging of the second item, wherein the second compact representation comprises information regarding a third shape provided on the second portion of the second packaging of the second item and information regarding a fourth shape provided on the second portion of the second packaging of the second item, the information regarding the third shape comprising information regarding at least one a third contour, a third line segment, a third color or a third location of the third shape;
determine whether the information regarding the first shape provided on the first portion of the first packaging of the first item is consistent with the information regarding the third shape provided on the second portion of the second packaging of the second item using at least one processor;
in response to determining that the information regarding the first shape is consistent with the information regarding the third shape,
determine whether the information regarding the second shape provided on the first portion of the first packaging of the first item is consistent with the information regarding the fourth shape provided on the second portion of the second packaging of the second item using the at least one processor; and
in response to determining that the information regarding the second shape is consistent with the information regarding the fourth shape,
store an indication that the first item is associated with the second item in at least one data store.

2. The system of claim 1, wherein the computing device is further configured with the one or more computer-executable instructions to:
in response to determining that the information regarding the first shape is not consistent with the information regarding the third shape, or
in response to determining that the information regarding the second shape is not consistent with the information regarding the fourth shape,
store an indication that the first item is not associated with the second item in at least one data store.

3. The system of claim 1, wherein the computing device is further configured with the one or more computer-executable instructions to:
extract data regarding a first boundary of the first packaging of the first item from at least the first image,
wherein each of the first plurality of features is located within the first boundary of the first packaging of the first item, and
wherein the data regarding the first boundary of the first packaging of the first item is extracted according to at least one of a Canny edge detector or a Sobel operator.

4. The system of claim 1, wherein the computing device is further configured with the one or more computer-executable instructions to:
interpret a first marking provided on the first packaging of the first item based at least in part on the first image of the first packaging of the first item,
wherein the second item is identified based at least in part on the interpreted first marking.

5. A computer-implemented method comprising:
identifying at least a first image of at least a first surface of a first packaging of a first item using at least one processor;
extracting first information regarding at least one first shape provided on the first surface of the first packaging of the first item within the first image using the at least one processor by at least identifying a first boundary of the first packaging of the first item within the first image using the at least one processor, the at least one first shape being provided on the first surface of the first packaging of the first item within the first boundary;
identifying second information regarding at least one second shape provided on a second surface of a second packaging of a second item within a second image using the at least one processor, wherein the second item is distinct from the first item and is known to comply with at least one standard;
determining whether at least a first portion of the first information is consistent with a second portion of the second information; and
in response to determining that the first portion of the first information is not consistent with the second portion of the second information, storing a first indication that the first item does not comply with the at least one standard in at least one data store.

6. The computer-implemented method of claim 5, further comprising:
in response to determining that the first portion of the first information is consistent with the second portion of the second information,
storing a second indication that the first item complies with the at least one standard in the at least one data store.

7. The computer-implemented method of claim 5, wherein extracting the first information regarding the at least one first shape provided on the first surface of the first packaging of the first item further comprises:
performing a geometric transformation of the first image, wherein the geometric transformation is at least one of a translation, a scaling, a reflection, a rotation or a shear of at least a portion of the first image comprising the first surface of the first packaging of the first item.

8. The computer-implemented method of claim 5, wherein the first boundary of the first packaging of the first item is identified according to at least one of a Canny edge detection algorithm or a Sobel operator.

9. The computer-implemented method of claim 5, wherein the at least one first shape is identified within the first boundary of the first packaging of the first item according to at least one of a Canny edge detection algorithm or a Sobel operator.

10. The computer-implemented method of claim 5, wherein the at least one first shape is at least a portion of at least one of a label, a character, a trademark or an indicium provided on the first surface of the first packaging of the first item, and
wherein the portion of the first image comprises the first surface.

11. The computer-implemented method of claim 5, wherein the at least one first shape comprises at least one of an arc, a circle, an ellipse, a hyperbola, a line segment, a parabola or a polygon.

12. The computer-implemented method of claim 11, wherein the first portion of the first information comprises at least one of:
an angle, a length or a radius of the arc;
at least one coordinate of a center of the circle;

a radius, a diameter, a circumference or an area of the circle;
at least one coordinate of at least one focus of the ellipse;
a sum of distances between the at least one focus and the ellipse;
a coordinate of at least one focal point of the hyperbola;
an equation defining at least one axis of the hyperbola;
a length of the line segment;
at least one coordinate of at least one end of the line segment;
at least one coordinate of a focus of the parabola;
an equation defining a directrix of the parabola;
at least one distance between one of the focus of the parabola or the directrix of the parabola and the parabola;
at least one coordinate of at least one vertex of the polygon; or
a length of at least one side of the polygon.

13. The computer-implemented method of claim 5, wherein the first information comprises at least one of:
a type of the at least one first shape;
at least one dimension of the at least one first shape; or
at least one coordinate of the at least one first shape, and
wherein the second information comprises at least one of:
a type of the at least one second shape;
at least one dimension of the at least one second shape; or
at least one coordinate of the at least one second shape.

14. The computer-implemented method of claim 13, further comprising:
identifying at least one tolerance associated with one of the type, the at least one dimension or the at least one coordinate of the at least one second shape,
wherein determining whether at least the first portion of the first information is consistent with at least the second portion of the second information comprises:
determining whether one of the type, the at least one dimension or the at least one coordinate of the at least one first shape is within the at least one tolerance of the one of the type, the at least one dimension or the at least one coordinate of the at least one second shape.

15. The computer-implemented method of claim 5, further comprising:
receiving a designation of the first item as the second item from a source of the first item; and
identifying the second information regarding the at least one second shape provided on the second surface of the second packaging of the second item within the second image based at least in part on the designation.

16. The computer-implemented method of claim 15, wherein receiving the designation of the first item as the second item from the source of the first item further comprises:
interpreting at least one marked identifier provided on at least the first surface of the first packaging of the first item,
wherein the at least one marked identifier is associated with the second item.

17. The computer-implemented method of claim 5, further comprising:
identifying information regarding a plurality of items, wherein each of the plurality of items is known to comply with the at least one standard, and wherein the second item is one of the plurality of items;
identifying a plurality of images, wherein each of the plurality of images is of at least one surface of a respective packaging of the plurality of items, and wherein the second image is one of the plurality of images;
extracting information regarding shapes provided on surfaces of the respective packaging of the items within the plurality of images using the at least one processor, wherein the at least one second shape is one of the shapes; and
storing at least some of the information regarding the shapes provided on the surfaces of the respective packaging of the items within the plurality of images in the at least one data store, wherein the second information regarding the at least one second shape provided on the second surface of the second packaging of the second item within the second image is included in the at least some of the information regarding the shapes provided on the surfaces of the respective packaging of the items within the plurality of images, and
wherein identifying the second information regarding the at least one second shape provided on the second surface of the second packaging of the second item within the second image further comprises:
comparing the first information to the at least some of the information regarding the shapes provided on the surfaces of the respective packaging of the items within the plurality of images in the at least one data store.

18. The computer-implemented method of claim 5, wherein identifying at least the first image of at least the first surface of the first packaging of the first item further comprises:
capturing the first image of at least the first surface of the first packaging of the first item using at least one imaging device.

19. The computer-implemented method of claim 18, further comprising:
causing the first item to travel along a first conveyor,
wherein the first image of at least the first surface of the first packaging of the first item is captured while the first item travels along the first conveyor.

20. A method comprising:
capturing a first image of at least one surface of a first packaging of a first item traveling on a conveying system at a fulfillment center, wherein the conveying system includes at least one conveyor;
normalizing the first image according to a first transformation using at least one processor;
identifying a first boundary on the at least one surface of the first packaging of the first item within the first image using the at least one processor;
identifying at least one first shape included in the normalized first image using the at least one computer processor, the at least one first shape being provided on the at least one surface of the first packaging of the first item within the first boundary;
defining a first set of attributes of the at least one first shape included in the normalized first image using the at least one processor;
identifying a plurality of sets of attributes of shapes included in images of compliant items using the at least one computer processor, wherein each of the images includes a shape provided on a surface of a respective packaging of one of the compliant items;
comparing the first set of attributes of the at least one first shape included in the normalized first image to the plurality of sets of attributes of the shapes included in the images of the respective packaging of the compliant items using the at least one processor;

determining whether the first set of attributes of the at least one first shape included in the normalized first image corresponds to at least one of the plurality of sets of attributes of the shapes included in the images of the respective packaging of the compliant items using the at least one processor;

in response to determining that the first set of attributes of the at least one first shape included in the normalized first image does not correspond to any of the plurality of sets of attributes of the shapes included in the images of the respective packaging of the compliant items, identifying a first storage facility associated with items that are not compliant using the at least one processor; and causing the first item to be transported to the first storage facility by the conveying system, wherein each of the compliant items is determined based at least in part on a comparison of the plurality of sets of attributes with at least one standard.

21. The method of claim 20, further comprising:

in response to determining that the first set of attributes of the at least one first shape included in the normalized first image corresponds to the at least one of the plurality of sets of attributes of the shapes included in the images of the respective packaging of the compliant items, identifying a second item associated with the at least one of the plurality of sets of attributes of the shapes included in the images of the respective packaging of the compliant items using the at least one processor;

identifying a second storage facility associated with the second item using the at least one processor; and causing the first item to be transported to the second storage facility by the conveying system.

22. The method of claim 21, further comprising:

in response to determining that the first set of attributes of the at least one first shape included in the normalized first image corresponds to the at least one of the plurality of sets of attributes of the shapes included in the images of the respective packaging of the compliant items, determining a type of item associated with the second item using the at least one processor; and storing an indication that one of the type of item has arrived at the fulfillment center.

\* \* \* \* \*